(12) United States Patent
Zaabab

(10) Patent No.: US 8,386,802 B2
(45) Date of Patent: *Feb. 26, 2013

(54) METHOD AND APPARATUS FOR PROCESSING ARBITRARY KEY BIT LENGTH ENCRYPTION OPERATIONS WITH SIMILAR EFFICIENCIES

(75) Inventor: Hafid Zaabab, Ottawa (CA)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/096,470

(22) Filed: Apr. 28, 2011

(65) Prior Publication Data

US 2011/0208976 A1    Aug. 25, 2011

Related U.S. Application Data

(63) Continuation of application No. 12/287,864, filed on Oct. 14, 2008, now Pat. No. 7,962,758, which is a continuation of application No. 10/228,151, filed on Aug. 26, 2002, now Pat. No. 7,451,326.

(51) Int. Cl.
  *H04L 29/06* (2006.01)
(52) U.S. Cl. ...................................................... 713/189
(58) Field of Classification Search .................. 713/189
  See application file for complete search history.

(56) References Cited

U.S. PATENT DOCUMENTS

| | | | |
|---|---|---|---|
| 4,797,848 A | 1/1989 | Walby | |
| 4,839,801 A | 6/1989 | Nicely et al. | |
| 4,916,652 A | 4/1990 | Schwartz et al. | |
| 5,001,661 A | 3/1991 | Corleto et al. | |
| 5,101,431 A | 3/1992 | Even | |
| 5,210,710 A | 5/1993 | Omura | |
| 5,313,530 A | 5/1994 | Iwamura | |
| 5,321,752 A | 6/1994 | Iwamura et al. | |
| 5,398,284 A | 3/1995 | Koopman, Jr. et al. | |
| 5,414,651 A | 5/1995 | Kessels | |
| 5,499,299 A | 3/1996 | Takenaka et al. | |
| 5,513,133 A | 4/1996 | Gressel et al. | |
| 5,600,720 A | 2/1997 | Iwamura et al. | |
| 5,623,683 A | 4/1997 | Pandya | |
| 5,666,419 A | 9/1997 | Yamamoto et al. | |
| 5,724,280 A | 3/1998 | Davis | |
| 5,742,530 A | 4/1998 | Gressel, et at. | |
| 5,805,914 A | 9/1998 | Wise et al. | |
| 5,848,159 A | 12/1998 | Collins, et at. | |
| 5,867,412 A | 2/1999 | Suh | |
| 5,923,871 A | 7/1999 | Gorshtein et al. | |
| 5,982,900 A | 11/1999 | Ebihara et al. | |
| 5,987,489 A | 11/1999 | Monier | |
| 6,026,421 A | 2/2000 | Sabin et al. | |

(Continued)

FOREIGN PATENT DOCUMENTS

WO    WO 02/052777 A2    7/2002

OTHER PUBLICATIONS

"Modular Exponentiation on Reconfigurable Hardware," by Thomas Blum (Thesis) Worcester Polytechnic Institute pp. 1-107 (1999).

(Continued)

*Primary Examiner* — Jason Gee
(74) *Attorney, Agent, or Firm* — Morris & Kamlay LLP

(57) ABSTRACT

A calculating apparatus, or system, having a plurality of stages, such as in a pipeline arrangement, has the clocking rail or conductor positioned alongside the stages. With a large number, i.e., hundreds, of stages arranged in parallel subarrays, the clocking conductor is snaked alongside the subarrays. In individual stages it is arranged that the shortest of the two calculations taking place in a stage, takes place in the return path. An array can be divided into separate sections for independent processing.

16 Claims, 15 Drawing Sheets

U.S. PATENT DOCUMENTS

| | | | |
|---|---|---|---|
| 6,061,706 | A | 5/2000 | Gai et al. |
| 6,088,453 | A | 7/2000 | Shimbo |
| 6,088,800 | A | 7/2000 | Jones et al. |
| 6,144,743 | A | 11/2000 | Yamada et al. |
| 6,151,393 | A | 11/2000 | Jeong |
| 2002/0087708 | A1* | 7/2002 | Low et al. .................. 709/231 |
| 2003/0039355 | A1 | 2/2003 | McCanny et al. |
| 2003/0198345 | A1* | 10/2003 | Van Buer .................. 380/43 |

OTHER PUBLICATIONS

Schubert, A., et al., "Reusable Cryptographic VLSI Core Based on the Safer K-128 Algorithm with 251.8 Mbit/s Throughput," *Signal Processing Systems*, 1998, SIPS '98, 1998 IEEE Workshop on Cambridge, MA, USA Oct. 8-10, 1998, New York, New York, USA, IEEE, US, pp. 437-446, Germany XP010303746 ISBN: 0-7803-4997-0.

* cited by examiner

METHOD AND APPARATUS FOR PROCESSING ARBITRARY KEY BIT LENGTH ENCRYPTION OPERATIONS WITH SIMILAR EFFICIENCIES

RELATED APPLICATION

This application is a continuation of U.S. application Ser. No. 12/287,864, filed Oct. 14, 2008 now U.S. Pat. No. 7,962,758, which is a continuation of Ser. No. 10/228,151, filed Aug. 26, 2002, now U.S. Pat. No. 7,451,326.

The entire teachings of the above applications are incorporated herein by reference.

FIELD OF THE INVENTION

This invention relates generally to parallel processors, and in particular to a parallel processor capable of processing arbitrary key bit length encryption operations with similar efficiencies using a same processor.

BACKGROUND OF THE INVENTION

It is becoming relatively common to exchange electronically stored documents between parties to a transaction, for instance via a widely distributed information network such as the Internet of the World Wide Web (WWW). A common problem with the Internet is a lack of secure communication channels. Thus, in order for hospitals, governments, banks, stockbrokers, and credit card companies to make use of the Internet, privacy and security must be ensured. One approach to solving the aforementioned problem uses data encryption prior to transmission. In a prior art system, a host computer system is provided with an encryption unit, for example an encryption processor that is in electrical communication with at least a memory circuit for storing at least a private encryption key. When information is to be transmitted from the host computer system to a recipient via the Internet and is of a confidential nature, the information is first passed to the encryption processor for encryption using the stored private key. Typically, a same private key is used every time a data encryption operation is performed. Alternatively, an encryption key is selected from a finite set of private encryption keys that is stored in the at least a memory circuit in electrical communication with the encryption processor.

Of course, a data encryption operation that is performed by an encryption processor is a mathematical algorithm in which an input data value, for instance a hashed version of an electronic document, is the only variable value. It is, therefore, possible to optimize the encryption processor to perform a desired encryption function using a least amount of processor resources. Additionally, in the prior art encryption units the optimized encryption processor is typically separate from the microprocessor of the host computer system, because it is best optimized in this way.

Several standards exist today for privacy and strong authentication on the Internet through encryption/decryption. Typically, encryption/decryption is performed based on algorithms which are intended to allow data transfer over an open channel between parties while maintaining the privacy of the message contents. This is accomplished by encrypting the data using an encryption key by the sender and decrypting it using a decryption key by the receiver. In symmetric key cryptography, the encryption and decryption keys are the same.

Encryption algorithms are typically classified into public-key and secret-key algorithms. In secret-key algorithms, keys are secret whereas in public-key algorithms, one of the keys is made widely known to the general public. Block ciphers are representative of the secret-key cryptosystems in use today. Usually, for block ciphers, symmetric keys are used. A block cipher takes a block of data, typically 32-128 bits, as input data and produces the same number of bits as output data. The encryption and decryption operations are performed using the key, having a length typically in the range of 56-128 bits. The encryption algorithm is designed such that it is very difficult to decrypt a message without knowing the key.

In addition to block ciphers, Internet security protocols also rely on public-key based algorithms. A public key cryptosystem such as the Rivest, Shamir, Adelman (RSA) cryptosystem described in U.S. Pat. No. 5,144,667 issued to Pogue and Rivest uses two keys, one of which is secret—private—and the other of which is publicly available. Once someone publishes a public key, anyone may send that person a secret message encrypted using that public key; however, decryption of the message can only be accomplished by use of the private key. The advantage of such public-key encryption is private keys are not distributed to all parties of a conversation beforehand.

In contrast, when symmetric encryption is used, multiple secret keys are generated, one for each party intended to receive a message, and each secret key is privately communicated. Attempting to distribute secret keys in a secure fashion results in a similar problem as that faced in sending the message using only secret-key encryption; this is typically referred to as the key distribution problem.

Key exchange is another application of public-key techniques. In a key exchange protocol, two parties can agree on a secret key even if a third party intercepts their conversation. The Diffie-Hellman exponential key exchange method, described in U.S. Pat. No. 4,200,770, is an example of such a protocol. Most public-key algorithms, such as RSA and Diffie-Hellman key exchange, are based on modular exponentiation, which is the computation of $\alpha^x$ mod p. This expression means "multiply $\alpha$ by itself x times, divide the answer by p, and take the remainder." This is very computationally expensive to perform, for the following reason. In order to perform this operation, many repeated multiplication operations and division operations are required. Techniques such as Montgomery's method, described in "Modular Multiplication Without Trial Division," from Mathematics of Computation, Vol. 44, No. 170 of April 1985, can reduce the number of division operations required but do not overcome this overall computational expense. In addition, for present data encryption systems the numbers used are very large (typically 1024 bits or more), so the multiply and divide instructions found in common CPUs cannot be used directly. Instead, special algorithms that break down the large multiplication operations and division operations into operations small enough to be performed on a CPU are used. These algorithms usually have a run time proportional to the square of the number of machine words involved. These factors result in multiplication of large numbers being a very slow operation. For example, a Pentium® processor can perform a 32×32-bit multiply in 10 clock cycles. A 2048-bit number can be represented in 64 32-bit words. A 2048×2048-bit multiply requires 64×64 separate 32×32-bit multiplication operations, which takes 40960 clocks on the Pentium® processor. An exponentiation with a 2048-bit exponent requires up to 4096 multiplication operations if done in the straightforward fashion, which requires about 167 million clock cycles. If the Pentium processor is running at 166 MHZ, the entire operation requires roughly one second. Of course, the division operations add further time to the overall computation times.

Clearly, a common CPU such as a Pentium cannot expect to do key generation and exchange at any great rate.

Pipeline processors comprising a plurality of separate processing elements arranged in a serial array, and in particular a large number of processing elements, are known in the prior art and are particularly well suited for executing data encryption algorithms. Two types of pipeline processor are known: processors of an in-one-end-and-out-the-other nature, wherein there is a single processing direction; and, bi-directional processors of an in-and-out-the-same-end nature, wherein there is a forward processing direction and a return processing direction. Considering a specific example of a bi-directional pipeline processor, a first data block is read from a memory buffer into a first processing element of the serial array, which element performs a first stage of processing and then passes the first data block on to a second processing element. The second processing element performs a second stage of processing while, in parallel, the first processing element reads a second data block from the memory buffer and performs a same first processing stage on the second data block. In turn, each data block propagates in a step-by-step fashion from one processing element to a next processing element along the forward processing direction of the serial array. At each step, there is a processing stage that performs a same mathematical operation on each data block that is provided thereto. Simultaneously, a result that is calculated at each processing element is provided to a previous processing element of the serial array, with respect to the return processing direction, which results comprise in aggregate the processed data returned by the encryption processor. This assembly-line approach to data processing, using a large number of processing elements, is a very efficient way of performing the computationally expensive data encryption algorithms described previously. Of course, the application of pipeline processors for performing computationally expensive processing operations is other than limited strictly to data encryption algorithms, which have been discussed in detail only by way of example.

It is a disadvantage of the prior art encryption processors that the processors are limited to fixed key sizes or alternatively to fixed performance. Thus, either a processor only works with keys of, for example, 128 bits or the processor requires equal time to process a 128 bit encryption operation as to process a 40 bit encryption operation. Typically, these two design requirements allow for best performance of the processor.

It would be advantageous to provide a parallel processor capable of processing arbitrary key bit length encryption operations with similar efficiencies using a same processor.

OBJECT OF THE INVENTION

It is an object of the invention to provide a pipeline processor capable of processing encryption operations using keys with different bit lengths with similar efficiencies.

SUMMARY OF THE INVENTION

In accordance with the invention there is provided a method for processing data comprising the steps of:
a) providing a pipeline processor including n individual processing elements arranged in a serial array such that a first processing element precedes a second processing element which precedes an nth processing element;
b) providing an m-bit encryption key to the pipeline processor;
c) providing data indicative of the encryption key length to the pipeline processor;
d) providing data to the first processing element for processing;
e) determining a last processing element in dependence upon at least the data indicative of the encryption key length;
f) providing a signal to the last processing element indicative of the processing element being the last processing element,
g) propagating data for further processing in a step-wise forward serial fashion from the first processing element only until the last processing element; and,
wherein at least two of the processing elements within a same pipeline processor are determinable as the last processing element.

In accordance with the invention there is provided an apparatus for processing data comprising:
a plurality of individual processing elements arranged in a serial array wherein a first processing element precedes a second processing element which precedes an nth processing element;
a port in electrical communication with at least a processing element of the serial array for providing data to the serial array for processing; and,
logic circuitry in electrical communication with the port and with at least two processing elements of the serial array for, in use, processing data indicative of an encryption key length to determine a last processing element of the serial array and for providing a signal to one of the at least two processing elements that is the determined processor element of the serial array in dependence upon the data indicative of an encryption key length.

In accordance with the invention there is provided an apparatus for processing data comprising:
a plurality of individual processing elements arranged in a serial array wherein a first processing element precedes a second processing element which precedes an nth processing element;
a logic circuit internal to each individual processing element for, in use, processing data indicative of an encryption key length and for providing a signal internal to the processing element indicative of a last processing element status, the signal provided in dependence upon the data indicative of an encryption key length.

BRIEF DESCRIPTION OF THE DRAWINGS

The invention will be readily understood by the following description of preferred embodiments, in conjunction with the following drawings, in which.

DETAILED DESCRIPTION OF THE INVENTION

The present invention is concerned with an implementation of a parallel processor for use in encryption operations, the implementation being such that the parallel processor supports variable length encryption keys without substantially compromising efficiency.

Figure 1:
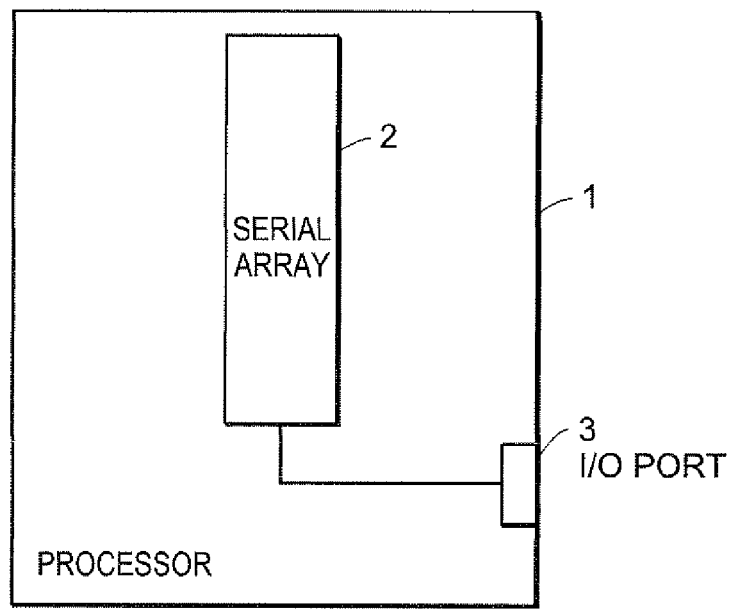
FIG. 1 shows a simplified block diagram of an embodiment of a pipeline processor according to the prior art.

Referring to FIG. 1, shown is a simplified block diagram of a pipeline processor 1 according to the prior art. The processor 1 includes a plurality of processor elements, for instance, serial array 2 supporting 256 bit encryption. An input/output port 3 is in communication with the first processing element (not shown) of the array 2, for receiving data for processing by the processor 1, for example from a client station (not shown) that is also in operative communication with the port 3.

Figure 2:
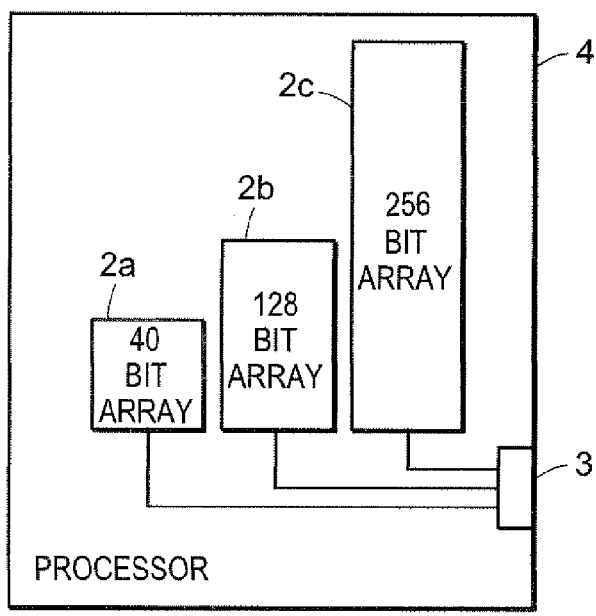
FIG. 2 shows a simplified block diagram of another embodiment of a pipeline processor according to the prior art.

In order to perform an encryption operation, an encryption key of a predetermined length is provided to the processor 1 and the encryption operation is performed. Alternatively, if the encryption key is less than the predetermined length, it is padded to bring it to the predetermined length and then the operation is performed. In either case, the operation takes an approximately same predetermined amount of time. Unfortunately, as key lengths grow larger, the efficiency of the prior art processor 1 for processing older, shorter keys is reduced. For example, a processor designed to accommodate 256 bit keys will process a forty-bit key that has been padded to 256 bits at approximately $\frac{1}{6}^{th}$ of the "efficient" time for processing only the forty-bit key. This is a poor allocation of resources. In order to better allocate resources, some processors include a plurality of processor arrays each for processing a different length encryption key as shown in FIG. 2. Thus the processor 4 would include a forty bit encryption processor array 2a, a 128 bit encryption processor array 2b and a 256 bit encryption processor array 2c. An input/output port 3 is in communication separately with the first processing element of each array 2a, 2b and 2c, for receiving data for processing by the processor 4, for example from a client station (not shown) that is also in operative communication with the port 3. Such an efficient implementation is inefficient in resource usage and, as such, is undesirable.

Figure 3A:
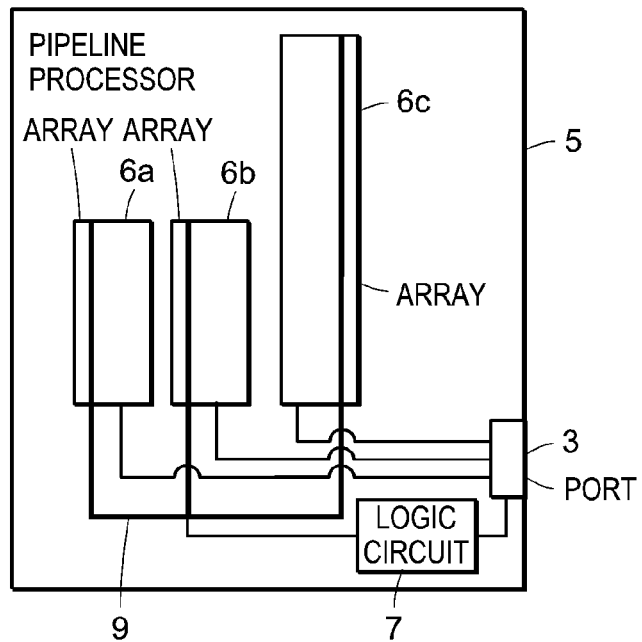
FIG. 3a shows a simplified block diagram of a pipeline processor having a distributed decrementing circuit according to a first embodiment of the present invention.

Referring now to FIG. 3a, shown is a simplified block diagram of a pipeline processor 5 for processing arbitrary key bit length encryption operations with similar efficiencies, according to a first embodiment of the present invention. The pipeline processor 5 includes at least one array and in FIG. 3a is shown with a plurality of arrays 6a, 6b and 6c of processor elements (processor elements not shown), for instance, arrays 6a and 6b each support 256 bit encryption and array 6c supports 512 bit encryption. An input/output port 3 is separately in communication with the first processing element of each array 6a, 6b and 6c, for receiving data for processing by the pipeline processor 5 from a client station (not shown) that is also in operative communication with the port 3. A logic circuit 7 is additionally in electrical communication with the input/output port 3 and with a last-bit signal conductor 9, which conductor extends in a sinuous form alongside each element within each array 6a, 6b and 6c. The logic circuit 7 is for receiving data indicative of an encryption key length and for providing a signal via conductor 9 to each element within each array 6a, 6b and 6c in dependence upon said data.

Figure 3B:
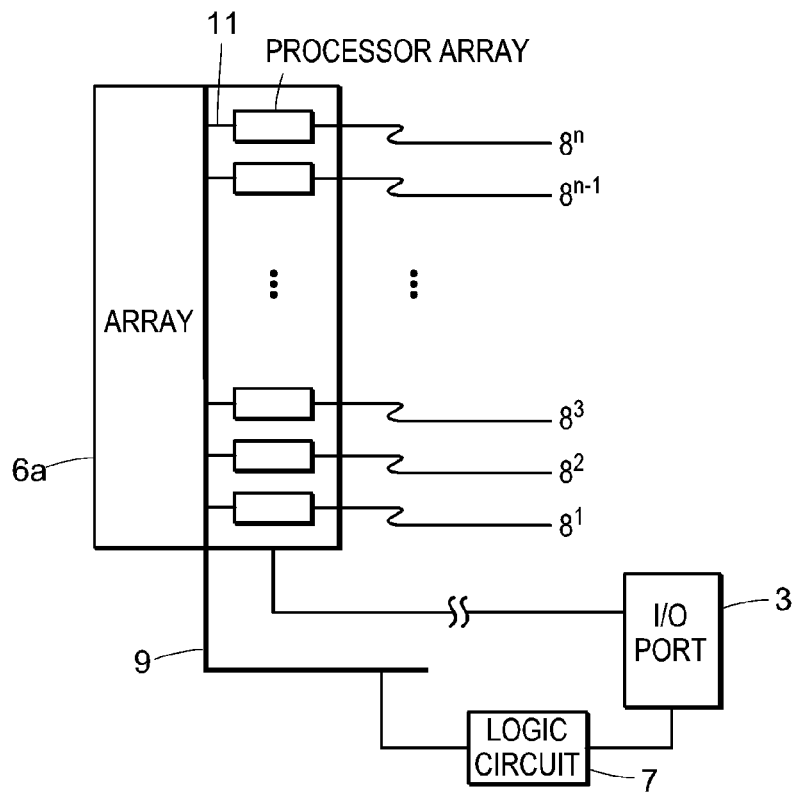
FIG. 3b shows a simplified block diagram of a serial processor array of the pipeline processor of FIG. 3a in communication with the distributed decrementing circuit.

Referring now to FIG. 3b, shown is a simplified block diagram of the serial array 6a (arrays 6b and 6c have been omitted for clarity) comprising processor elements $8^1$, $8^2$, $8^3$, ..., $8^{n-1}$ and $8^n$ being the final processor of the serial array. Each processor element 8 is separately in electrical communication with the last-bit signal conductor 9 via a connection 11. By way of a specific example, each processor element is an eight bit processor element, such that serial array 6a comprises 32 individual processor elements for supporting 256 bit encryption. Thus, the most efficient allocation of processor resources requires five individual processor elements to perform a forty bit encryption operation, eight individual processor elements to perform a 64 bit encryption operation, and sixteen processor elements to perform a 128 bit encryption operation, etc. Optionally, processor elements other than eight-bit processor element are used.

It is illustrative to consider a specific example, such as for instance a forty bit encryption operation requiring at least five individual eight bit processor elements to complete. In use, data is provided for encryption by the client station (not shown) via port 3, for example as a stream of individual blocks of data which comprise in aggregate a complete data file. At the beginning of a first processing cycle the first processor element $8^1$ in array 6a receives a first data block from a memory buffer (not shown) of port 3 and performs a predetermined first stage of processing thereon. In the present example the first stage of processing corresponds to an encryption operation using an eight-bit segment of the encryption key. Of course, first processor element $8^1$ is time-synchronized with the memory buffer (not shown) of port 3 and with the logic circuit 7 such that the stream of data blocks is gated to first processor element $8^1$ in synchronization. At the beginning of a second processing cycle, first processor element $8^1$ receives a second data block via port 3. At approximately a same time the first processing element $8^1$ provides an output in the form of the first data block along a forward processing-path to second processor element $8^2$. Additionally, the first processor element $8^1$ provides a first result calculated therein along a return processing-path to the memory buffer of port 3. This assembly line approach to processing data continues until the final result is provided to the memory buffer of port 3 along the return processing-path. Advantageously, the stream of data blocks is gated to first processor element $8^1$ in synchronization, as was described previously. At the beginning of each processing cycle the logic circuit 7 decrements the data indicative of the encryption key length by a predetermined amount. In the present example the encryption key length is forty bits, requiring five processor elements to complete the encryption operation, such that the data indicative of the encryption key length is representative of the value five. Then, at the beginning of the first processing cycle the logic circuit 7 decrements by one the value five to indicate that four processing cycles remain. The value is further decremented at the beginning of the second to fifth processing cycles, at which time the logic circuit 7 returns a zero value. If a zero value results, indicating that the end of the encryption data has been reached, then the logic circuit 7 transmits a last bit signal via the last bit signal conductor 9 to every processor element. A processor element having just received the last bit signal along the forward processing path, in this case the fifth processor element, "knows" immediately that it is the last processor element and turns the data around, such that data is other than propagated past said processor element along the forward processing path. Each of the processor elements preceding the last processor element receives data along both the forward processing path and the return processing path at the time that the last bit signal is transmitted, which is indicative of other than last element status.

Of course, if the value of the logic circuit 7 reaches other than zero during a particular processing cycle, then processing continues normally. For example, during the second processing cycle, first processor element $8^1$ performs a same first processing operation on the second data block and second processor element $8^2$ performs a second processing operation on the first data block. At the end of the second processing cycle, the first data block is propagated along the forward processing path between the second and the third processor elements $8^2$ and $8^3$, respectively. Simultaneously, the second data block is propagated along the forward processing path between the first and the second processor elements $8^1$ and $8^2$, respectively. Additionally, the second processor element $8^2$ provides a result calculated therein along the return processing-path to the first processor element $8^1$. Of course, simultaneously gating data blocks along the forward processing-path and along the return processing-path between adjacent processor elements typically involves synchronous timing.

Using the bi-directional pipeline design shown, the result is efficiently calculated regardless of key length and additional processing cycles are avoided. The use of processors for supporting keys of different lengths within the device supports more than one efficient encryption process at a time— each process having a maximum key size. That said, in a common encryption processing system, statistics are easily used to select processor sizes to provide statistically a best performance for a given resource usage.

Alternatively, the last-bit signal conductor 9 is in electrical connection with only a subset of the processor elements 8. For example, in serial array 6a the last-bit signal conductor 9 is optionally connected to every fourth processor element. So with eight bit processor elements, the processor 5 processes encryption data as a series of 32 bit segments. For a processor which supports up to 256 bit encryption processed by 32 bit segments, eight possible processing lengths are supported. Advantageously the number of datapaths for conducting the last bit signal from the logic circuit 7 to the processor elements is reduced from 32 to only eight separate datapaths, greatly facilitating the ease of fabrication of the processor 5. Unfortunately, processing resources are allocated with lower efficiency for encryption key lengths that are other than divisible by 32 bits, for instance the forty-bit encryption key which padded to at least 64 bits prior to processing. Thus, the data is turned around at the eighth processor element, instead of the fifth processor element as was discussed above.

Figure 4A:
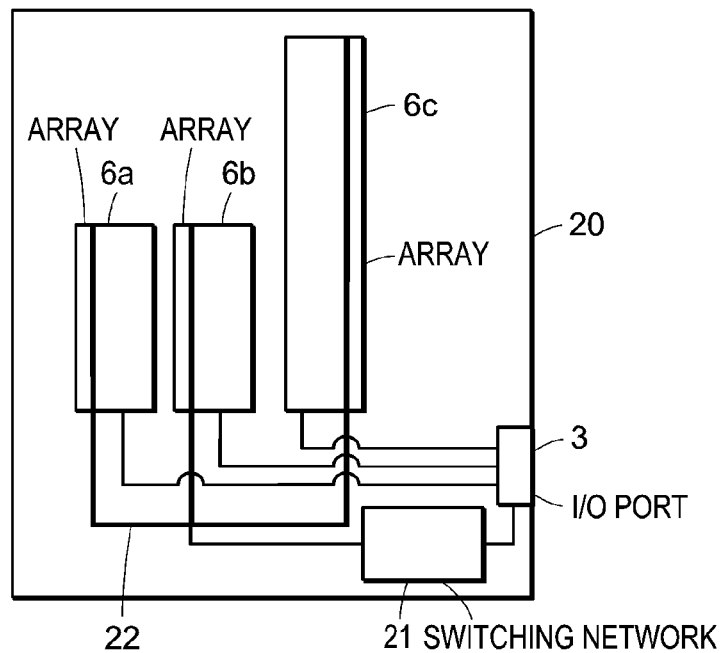
FIG. 4a shows a simplified block diagram of a pipeline processor having a circuit according to a second embodiment of the present invention.
Figure 4B:
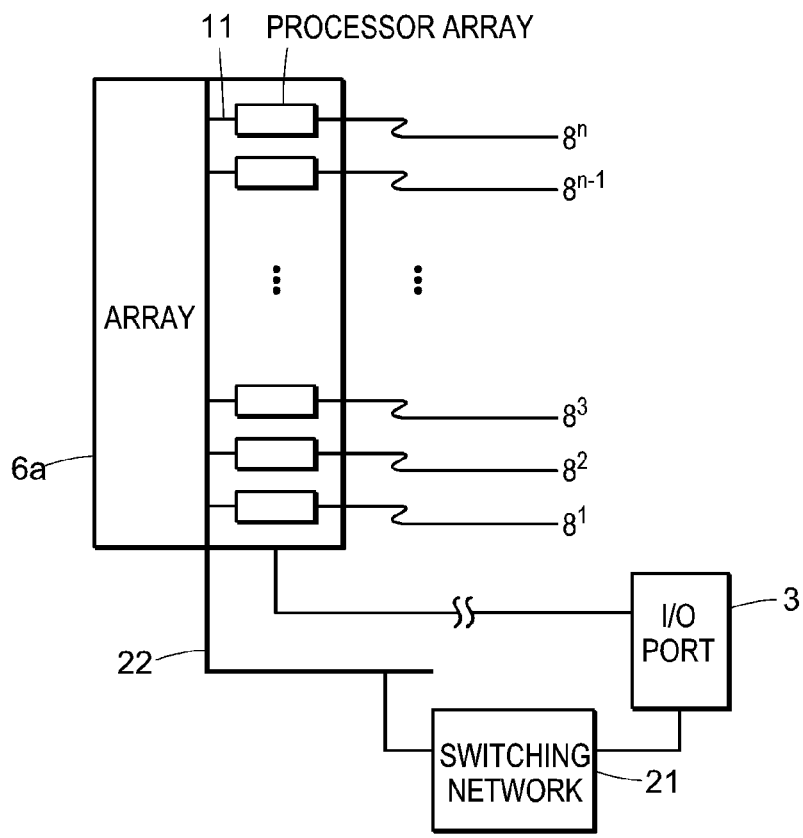
FIG. 4b shows a simplified block diagram of a serial processor array of the pipeline processor of FIG. 4a in communication with the circuit.

Referring now to FIG. 4a and FIG. 4b, shown is a simplified block diagram of a pipeline processor 20 for processing arbitrary key bit length encryption operations with similar efficiencies, according to a second embodiment of the present invention. Elements identical to those previously described with reference to FIG. 3a and FIG. 3b have identical numbers herein, and their discussion is omitted for the sake of brevity. A switching network 21, for example comprising a series of gates, is additionally in electrical communication with the input/output port 3 and with a series of hardwired addressable datapaths 22. The switching network 21 is for receiving data indicative of an encryption key length and for providing a signal to a determined processing element via the series of hardwired addressable datapaths 22. In use, the data indicative of an encryption key length is provided to the switching network 21 such that the series of gates determines to which processor element 8 a signal indicative of a last processing element status is to be sent. The switching network 21 transmits said signal to the determined processing element via a selected datapath of the hardwired addressable datapaths 22. For instance, the signal is used for setting a bit of the determined processing element to a value that is indicative of a last processing element status. Advantageously, when the determined processing element finishes processing the data for encryption, the processing element immediately turns the data around such that the data is read out by a memory buffer (not shown) of the port 3. Of course, optionally the datapaths are provided between the switching network 21 and a predetermined subset of the processing elements, such as for example every fourth processing element. Advantageously the total number of datapaths and the complexity of the switching network are reduced. Unfortunately, processing resources are allocated with lower efficiency for encryption key lengths that are other than divisible by 32 bits, for instance the forty-bit encryption key which padded to at least 64 bits prior to processing.

Figure 5A:
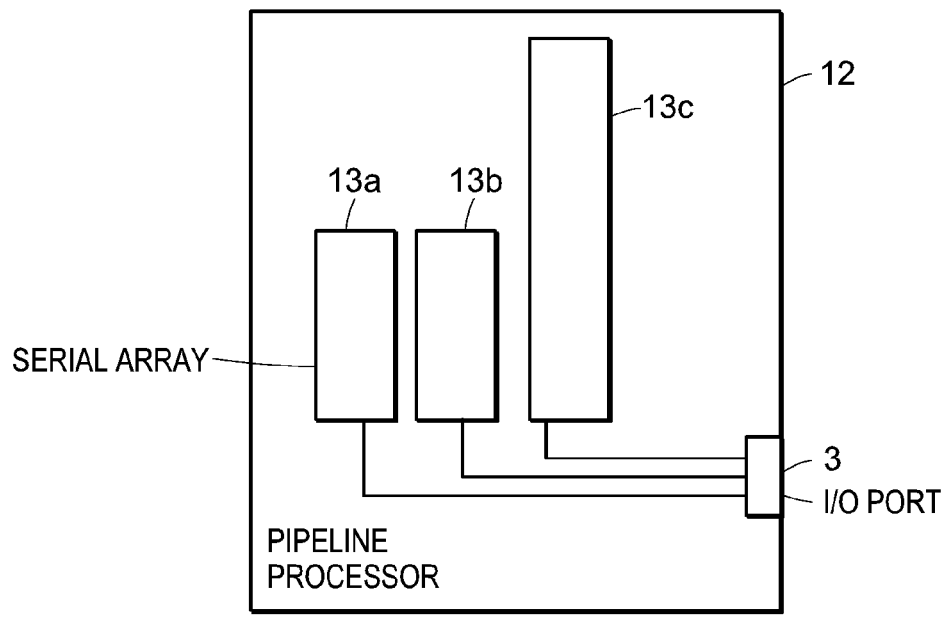
FIG. 5a shows a simplified block diagram of a pipeline processor according to a third embodiment of the present invention.
Figure 5B:
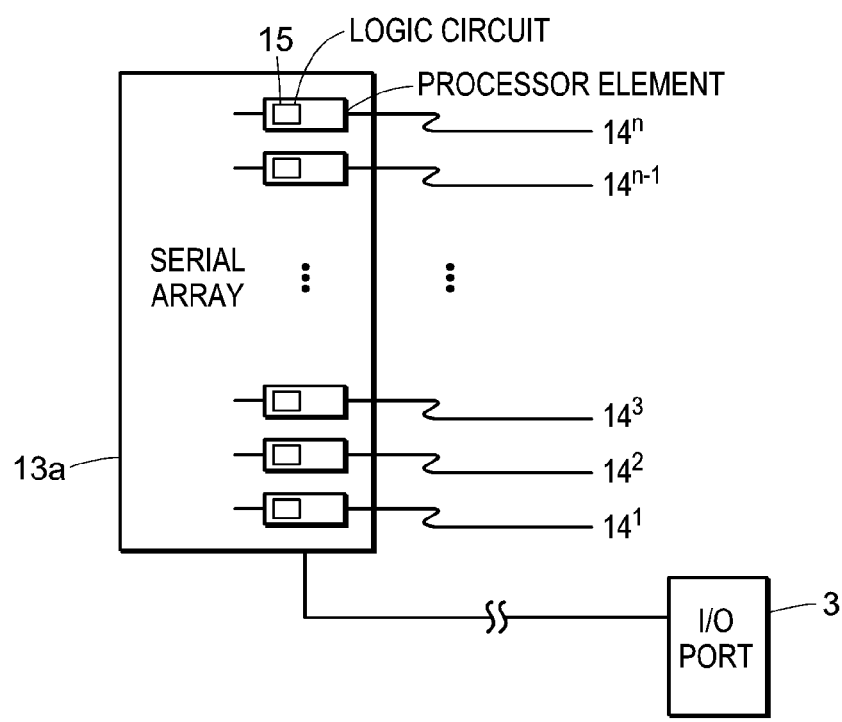
FIG. 5b shows a simplified block diagram of a serial processor array of the pipeline processor of FIG. 4a in which each processing element has an internal decrementing circuit.

Referring now to FIG. 5a and FIG. 5b, shown is a simplified block diagram of a pipeline processor 12 for processing arbitrary key bit length encryption operations with similar efficiencies, according to a third embodiment of the present invention. Elements identical to those previously described with reference to FIG. 3a and FIG. 3b have identical numbers herein, and their discussion is omitted for the sake of brevity. According to the third embodiment of the invention, each individual processing element 14 includes a dedicated logic circuit 15. In use, data indicative of an encryption key length is provided to the first processor element $14^1$ along with the data for encryption. The first processor element performs a predetermined first stage of processing on a first block of data, and additionally decrements the data indicative of the encryption key length by a predetermined amount. The decremented data indicative of the encryption key length is provided to the second processor element $14^2$ along with the first block of data. The logic circuit of the second processor element $14^2$ receives the decremented data indicative of the encryption key length and decrements said data by an additional predetermined amount. If the logic circuit of the second processor element $14^2$ calculates a zero value, then the logic circuit of the second processor element $14^2$ generates a signal internal to the second processor element $14^2$ indicative of a last processor element status. At approximately the time that the second processor element $14^2$ completes a predetermined second stage of processing, the second processor element $14^2$ turns the data around and the processed data is read out of the serial array 13a and into a memory buffer (not shown) of port 3.

Figure 6:
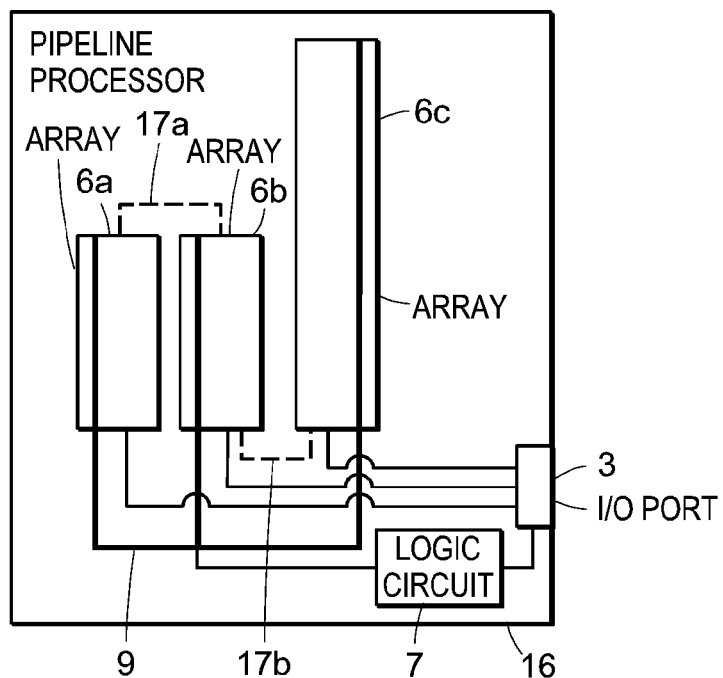
FIG. 6 shows a simplified block diagram of a fourth preferred embodiment of a pipeline processor according to the present invention.

Referring to FIG. 6, shown is a simplified block diagram of a pipeline processor 16 according to a fourth preferred embodiment of the present invention. The pipeline processor 16 includes a plurality of arrays 6a, 6b and 6c of processor elements (processor elements not shown), for instance, arrays 6a and 6b each supporting 256 bit encryption operations and array 6c supporting 512 bit encryption operations. Dotted lines 17a and 17b indicate optional electrical coupling for providing electrical communication between the last processing element of array 6a and the last element of array 6b, and between the first element of array 6b and the first element of array 6c, respectively. An input/output port 3 in communication with the first processing element of each array 6a, 6b, and 6c is for receiving data provided by a client station (not shown), also in operative communication with input/output port 3, the data for processing by an indicated one of the arrays 6a, 6b, and 6c. Here three processors are provided each having a maximum encryption key size supported but wherein the three processors are optionally concatenated to form a single 1024 bit processor. Of course, it is also possible to set up processors of arbitrary lengths, but this often incurs substantial addressing overhead, which can be undesirable. Of course, when maximum flexibility is desired, many smaller processing arrays, for example for processing 64 bit keys, are concatenated in accordance with this embodiment.

Figure 7:
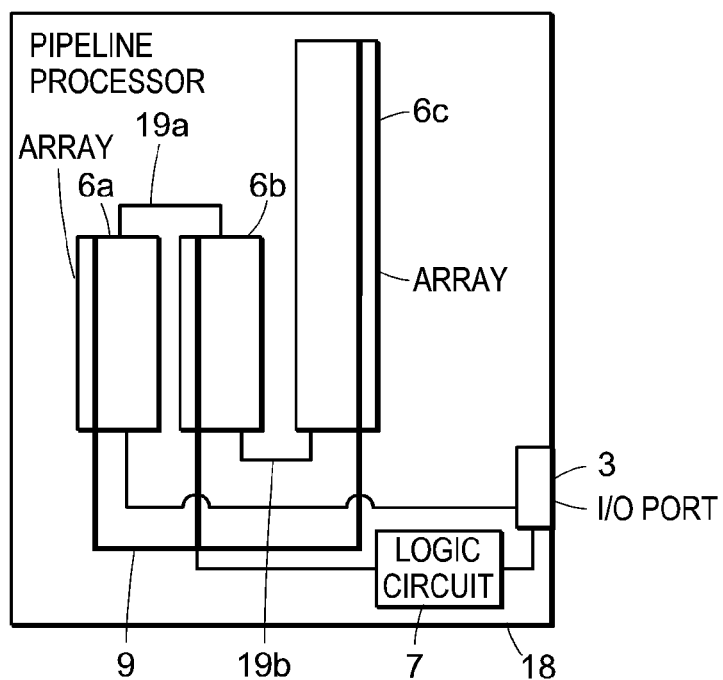
FIG. 7 shows a simplified block diagram of a fifth preferred embodiment of a pipeline processor according to the present invention.

Because data indicative of a key length is provided to the processor along with the data for processing and the encryption key, the processor can allocate sufficient processing units to the task and thereby efficiently allocate resources. Processor 16 is shown with a logic circuit 7 as was previously disclosed with reference to FIG. 3a and FIG. 3b. Thus, in the present embodiment the logic circuit tallies a number of bits processed by the processor 16, compares the tally to data indicative of the encryption key length, and transmits a universal signal via the last processor signal conductor 9 in dependence upon the comparison indicating an end of encryption data. Optionally, other systems for indicating a last processor element status are used, for instance the system described with reference to one of the second and third embodiments of the invention Referring now to FIG. 7, shown is a simplified block diagram of a pipeline processor 18 according to a fifth preferred embodiment of the present invention. The pipeline processor 18 includes a plurality of arrays 6a, 6b and 6c of processor elements (processor elements not shown), for instance, arrays 6a and 6b each supporting 256 bit encryption operations and array 6c supporting 512 bit encryption operations. The last processing element of array 6a and the last element of array 6b are in electrical communication via the hardware connection 19a, and the first element of array 6b and the first element of array 6c are in electrical communication via the hardware connection 19b, respectively. An input/output port 3 in communication with the first processing element of array 6a is for receiving data provided by a client station (not shown), also in operative communication with input/output port 3, the data for processing by the serial arrangement of the arrays 6a, 6b, and 6c. Optionally, separate inputs (not shown) are provided for gating data directly to at least a processor element other than the first element of array 6a.

Here the array 6b is bidirectional and, because of the implementation of the pipeline process as a bidirectional pipeline process, it is possible to begin using the last element of the array 6b once it has completed processing for an operation occurring in its other direction. As such, a significant improvement in efficiency results.

Because data indicative of a key length is provided to the processor along with the data for processing and the encryption key, the processor can allocate sufficient processing units to the task and thereby efficiently allocate resources. Processor 18 is shown with a logic circuit 7 as was previously disclosed with reference to FIG. 3a and FIG. 3b. Thus, in the present embodiment the logic circuit tallies a number of bits processed by the processor 18, compares the tally to data indicative of the encryption key length, and transmits a universal signal via the last processor signal conductor 9 in dependence upon the comparison indicating an end of encryption data. Optionally, other systems for indicating a last processor element status are used, for instance the system described with reference to one of the second and third embodiments of the invention.

The pipeline processors 16 and 18 of FIGS. 6 and 7, respectively, are operable in mode wherein data gated into the last processor element of the array 6a is made available to the last processor element of array 6b. For instance, when more than 256 processor elements are required for a particular processing operation, the effective length of the processor array is increased by continuing the processing operation within a second different array. Of course, when more than 512 processor elements are required for a particular processing operation, the effective length of the processor array is increased by continuing the processing operation within a third different array. For example, either one of the pipeline processors shown in FIGS. 6 and 7 are operable for performing: 256 bit encryption using a single array; 512 bit encryption using two different arrays; and, 1024 bit encryption using all three different arrays.

Advantageously, since it is known when a processor will complete processing, it becomes possible to allocate that processor to processing downstream of another processor. For example, assuming the processor 6a has processing elements for processing 256 bit encryption operations and begins processing a 256 bit encryption operation. Assume 6b is a similar processor. If, sometime after processing element 6a commences processing and before it is completed a processing request for a 512 bit operation arrives, it is possible to begin the operation on processing array 6b knowing that by the time data has propagated to the last element of processing array 6a, that element will have completed processing of the processing job in current processing. This improves overall system performance by reducing downtime of a processor while awaiting other processors to be available to support concatenated array processing.

Montgomery Based Pipeline Processing of Encryption Data

Applying Montgomery's algorithm, the cost of a modular exponentiation is reduced to a series of additions of very long integers. To avoid carry propagation in multiplication/addition architectures several solutions are known. These use Montgomery's algorithm, in combination with a redundant radix number system or a Residue Number System.

In S. E. Eldridge and C. D. Walter. Hardware implementation of Montgomery's modular multiplication algorithm. IEEE Transactions on Computers, 42(6):693-699, July 1993, Montgomery's modular multiplication algorithm is adapted for an efficient hardware implementation. A gain in speed results from a higher clock frequency, due to simpler combinatorial logic. Compared to previous techniques based on Brickell's Algorithm, a speed-up factor of two was reported.

The Research Laboratory of Digital Equipment Corp. reported in J. E. Vuillemin, P. Bertin, D. Roncin, M. Shand, H. H. Touati, and P. Boucard. Programmable active memories:

Reconfigurable systems come of age. IEEE Transactions on VLSI Systems, 4(1): 56-69, March 1996 and M. Shand and J. Vuillemin. Fast implementations of RSA cryptography. In Proceedings 11th IEEE Symposium on Computer Arithmetic, pages 252-259, 1993, an array of 16 XILINX 3090 FPGAs using several speed-up methods including the Chinese remainder theorem, asynchronous carry completion adder, and a windowing exponentiation method is used to implement modular exponentiation. The implementation computes a 970 bit RSA decryption at a rate of 185 kb/s (5.2 ms per 970 bit decryption) and a 512 bit RSA decryption in excess of 300 kb/s (1.7ms per 512 bit decryption). A drawback of this solution is that the binary representation of the modulus is hardwired into the logic representation so that the architecture must be reconfigured with every new modulus.

The problem of using high radices in Montgomery's modular multiplication algorithm is a more complex determination of a quotient. This behavior renders a pipelined execution of the algorithm other than straightforward. In H. Orup. Simplifying quotient determination in high-radix modular multiplication. In Proceedings 12th Symposium on Computer Arithmetic, pages 193-9, 1995, the algorithm is rewritten to avoid any operation involved in the quotient determination. The necessary pre-computation is performed only once for a given modulus.

P. A. Wang in the article New VLSI architectures of RSA public key crypto systems. In Proceedings of 1997 IEEE International Symposium on Circuits and Systems, volume 3, pages 2040-3, 1997 proposes a novel VLSI architecture for Montgomery's modular multiplication algorithm. The critical path that determines the clock speed is pipelined. This is done by interleaving each iteration of the algorithm. Compared to previous propositions, an improvement of the time-area product of a factor two was reported.

J. Bajard, L. Didier, and P. Kornerup in the article An RNS Montgomery modular multiplication algorithm. IEEE Transactions on Computers, 47(7): 766-76, July 1998, describe a new approach using a Residue Number System (RNS). The algorithm is implemented with n moduli in the RNS on n reasonably simple processors. The resulting processing time is O(n).

Of course, most of the references cited above relate to hardware implementations of processors that have little or no flexibility.

There have also been a number of proposals for systolic array architectures for modular arithmetic. These vary in terms of complexity and flexibility.

In E. F. Brickell. A survey of hardware implementations of RSA. In Advances in Cryptology—CRYPTO '89, pages 368-70. Springer-Verlag, 1990, E. F. Brickell summarizes the chips available in 1990 for performing RSA encryption.

In N. Takagi. A radix-4 modular multiplication hardware algorithm efficient for iterative modular multiplication operations. In Proceedings 10th IEEE Symposium on Computer Arithmetic, pages 35-42, 1991, the author proposes a radix-4 hardware algorithm. A redundant number representation is used and the propagation of carries in additions is therefore avoided. A processing speed-up of about six times compared to previous work is reported.

More recently an approach has been presented that utilizes pre-computed complements of the modulus and is based on the iterative Horner's rule in J. Yong-Yin and W. P. Burleson. VLSI array algorithms and architectures for RSA modular multiplication. IEEE Transactions on VLSI Systems, 5(2): 211-17, June 1997. Compared to Montgomery's algorithms these approaches use the most significant bits of an intermediate result to decide which multiples of the modulus to subtract. The drawback of these solutions is that they either need a large amount of storage space or many clock cycles to complete a modular multiplication.

The most popular algorithm for modular exponentiation is the square & multiply algorithm. Public-key encryption systems are, typically, based on modular exponentiation or repeated point addition. Both operations are in their most basic forms done by the square and multiply algorithm.

Method 1.1 compute $Z=X^E$ mod M, where $E=\Sigma_{i=0}^{n-1} e_i 2^i$, $e_i \in \{0,1\}$ 1. $Z=X$
2. FOR $i=n-2$ down to 0 DO
3. $Z=Z^2$ mod M
4. IF $e_i=1$ THEN $Z=Z \cdot X$ mod M
5. END FOR Method 1.1 takes $2(n-1)$ operations in the worst case and $1.5(n-1)$ on average. To compute a squaring and a multiplication in parallel, the following version of the square & multiply method can be used:

Method 1.2 computes $P=X^E$ mod M, where $E=\Sigma_{i=0}^{n-1} e_i 2^i$, $e_i \in \{0,1\}$ 1. $P_0=1, Z_0=X$
2. FOR $i=0$ to $n-1$ DO
3. $Z_{I+1}=Z_i^2$ mod M
4. IF $e_i=1$ THEN $P_{i+1}=P_i \cdot Z_i$ mod M
   ELSE $P_{i+1}=P_i$
5. END FOR Method 1.2 takes $2n$ operations in the worst case and $1.5n$ on average. A speed-up is achieved by applying the 1-ary method, such as that disclosed in D. E. Knuth, The Art of Computer Programming. Volume 2: Seminumerical Algorithms. Addison-Wesley, Reading, Mass., 2nd edition, 1981, which is a generalization of Method 1.1. The 1-ary method processes 1 exponent bits at a time. The drawback here is that $(2^1-2)$ multiples of X must be pre-computed and stored. A reduction to $2^{1-1}$ pre-computations is possible. The resulting complexity is roughly n/1 multiplication operations and n squaring operations.

As shown above, modular exponentiation is reduced to a series of modular multiplication operations and squaring steps using the Montgomery method. The method for modular multiplication described below was proposed by P. L. Montgomery in P. L. Montgomery. Modular multiplication without trial division. Mathematics of Computation, 44(170): 519-21, April 1985. It is a method for multiplying two integers modulo M, while avoiding division by M. The idea is to transform the integers in m-residues and compute the multiplication with these m-residues. In the end, the representations are transformed back to a normal representation thereof. This approach is only beneficial when a series of multiplication operations in the transform domain are computed (e.g., modular exponentiation).

To compute the Montgomery multiplication, a radix R>M, with gcd(M, R)=1 is selected. Division by R is preferably inexpensive, thus an optimal choice is $R=2^m$ if $M=\Sigma_{i=0}^{m-1} m_i 2^i$. The m-residue of x is xR mod M. $M'=M_{-1}$ modR is also computed. A function MRED(T) is provided that computes $TR^{-1}$ mod M: This function computes the normal representation of T, given that T is an m-residue.

Method 1.3 MRED(T): computes a Montgomery reduction of T $T<RM, R=2^m, M=\Sigma_{i=0}^{m-1} m_i 2^i, \gcd(M, R)=1$ 1. $U=TM'$ mod R
2. $t=(T+UM)/R$
3. IF $t \geq M$ RETURN $t-M$
   ELSE RETURN t The result of MRED(T) is $t=TR^{-1}$ mod M.

Now to multiply two integers a and b in the transform domain, where their respective representations are (aR mod M) and (bR mod M), a product of the two representations is provided to MRED(T):

$$MRED((aR \bmod M) \cdot (bR \bmod M)) = abR^2 R^{-1} = abR \bmod M$$

For a modular exponentiation this step is repeated numerous times according to Method 1.1 or 1.2 to get the final result ZR mod M or $P_n$R mod M. One of these values is provided to MRED(T) to get the result Z mod M or $P_n$ mod M.

The initial transform step still requires costly modular reductions. To avoid the division involved, compute $R^2$ mod M using division. This step needs to be done only once for a given cryptosystem. To get a and b in the transform domain MRED(a·$R^2$ mod M) and MRED(b·$R^2$ mod M) are executed to get aR mod M and bR mod M. Obviously, any variable can be transformed in this manner.

For a hardware implementation of Method 1.3: an m×m-bit multiplication and a 2m-bit addition is used to compute step 2. The intermediate result can have as many as 2m bits. Instead of computing U at once, one digit of an r-radix representation is computed at a time. Choosing a radix r, such that gcd(M, r)=1 is preferred. Division by r is also preferably inexpensive, thus an optimal choice is $r=2^k$. All variables are now represented in a basis-r representation. Another improvement is to include the multiplication A×B in the algorithm.

Method 1.4 Montgomery Modular Multiplication for computing A·B mod M, where $$M = \Sigma_{i=0}^{m-1}(2^k)^i m_i, m_i \in \{0,1 \ldots 2^k-1\}; B = \Sigma_{i=0}^{m-1}(2^k)^i b_i, b_i \in \{0,1 \ldots 2^k-1\};$$

$$A = \Sigma_{i=0}^{m-1}(2^k)^i a_i, a_i \in \{0,1 \ldots 2^k-1\};$$

$$A, B < M; M < R = 2^{km}; M' = -M^{-1} \bmod 2^k; gcd(2^k, M) = 1$$

1. $S_0 = 0$
2. FOR i=0 to m−1 DO
3. $q_i = (((S_i + a_i B) \bmod 2^k) M') \bmod 2^k$
4. $S_{i+1} = (S_i + q_i M + a_i B)/2^k$
5. END FOR
6. IF $S_m \geq M$ RETURN $S_m - M$
   ELSE RETURN $S_m$ The result of applying the method 1.4 is $S_m = ABR^{-1}$ mod M. At most two k×k-bit multiplication operations and a k-bit addition is required to compute step 3 for a radix $2^k$. For step 4 two k×m-bit multiplication operations and two m+k-bit additions are needed. The maximal bit length of S is reduced to m+k+2 bits, compared to the 2m bits of Method 1.3.

Method 1.5 is a simplification of Method 1.4 for radix r=2. For the radix r=2, the operations in step 3 of Method 1.4 are done modulo 2. The modulus M is odd due to the condition gcd(M, $2^k$)=1. It follows immediately that M=1 mod 2. Hence $M' = -M^{-1}$ mod 2 also degenerates to M'=1. Thus the multiplication by M' mod 2 in step 3 is optionally omitted.

Method 1.5 Montgomery Modular Multiplication (Radix r=2) for Computing

Montgomery Modular Multiplication for computing A·B mod M, where $$M = \Sigma_{i=0}^{m-1}(2^k)^i m_i, m_i \in \{0,1\};$$
$$B = \Sigma_{i=0}^{m-1}(2^k)^i b_i, b_i \in \{0,1\};$$
$$A = \Sigma_{i=0}^{m-1}(2^k)^i a_i, a_i \in \{0,1\};$$

$$A, B < M; M < R = 2^m; gcd(2, M) = 1$$

1. $S_0 = 0$
2. FOR i=0 to m−1 DO
3. $q_i = (S_i + a_i B) \bmod 2$
4. $S_{i+1} = (S_i + q_i M + a_i B)/2$
5. END FOR
6. IF $S_m \geq$ RETURN $S_m - M$
   ELSE RETURN $S_m$ The final comparison and subtraction in step 6 of Method 1.5 would be costly to implement, as an m bit comparison is very slow and expensive in terms of resource usage. It would also make a pipelined execution of the algorithm impossible. It can easily be verified that $S_{i+1} < 2M$ always holds if A, B<M. $S_m$, however, can not be reused as input A or B for the next modular multiplication. If two more executions of the for loop are performed with $a_{m+1} = 0$ and inputs A, B<2M, the inequality $S_{m+2} < 2M$ is satisfied. Now, $S_{m+2}$ can be used as input B for the next modular multiplication.

To further reduce the complexity of Method 1.5, B is shifted up by one position, i.e., multiplied by two. This results in $a_i \cdot B$ mod 2=0 and the addition in step 3 is avoided. In the update of $S_{i+1}$ $(S_i + q_i M + a_i B)/2$ is replaced by $(S_i + q_i M)/2 + a_i B$. The cost of this simplification is one more execution of the loop with $a_{m+2} = 0$. The Method below comprises these optimizations.

Method 1.6 Montgomery Modular Multiplication (Radix r=2) for computing A·B mod M, where $$M = \Sigma_{i=0}^{m-1}(2^k)^i m_i, m_i \in \{0,1\};$$
$$B = \Sigma_{i=0}^{m-1}(2^k)^i b_i, b_i \in \{0,1\};$$

$$A = \Sigma_{i=0}^{m-1}(2^k)^i a_i, a_i \in \{0,1\};$$
$$A, B < 2M; M < R = 2^{m+2}; gcd(2, M) = 1$$

1. $S_0 = 0$
2. FOR i=0 to m+2 DO
3. $q_i = (S_i) \bmod 2$
4. $S_{i+1} = (S_i + q_i M)/2 + a_i B$
5. END FOR The algorithm above calculates $S_{m+3} = (2^{-(m+2)} AB) \bmod M$. To get the correct result an extra Montgomery modular multiplication by $2^{2(m+2)}$ mod M is performed. However, if further multiplication operations are required as in exponentiation algorithms, it is better to pre-multiply all inputs by the factor $2^{2(m+2)}$ mod M. Thus every intermediate result carries a factor $2^{m+2}$. Montgomery multiplying the result by "1" eliminates this factor.

The final Montgomery multiplication with "1" insures that a final result is smaller than M.

High-Radix Montgomery Algorithm

By avoiding costly comparison and subtraction operations of step 6 and changing the conditions to $4M < 2^{km}$ and A, B<2M some optimization results for implementing method 1.4 in hardware. The penalty is two more executions of the loop. The resulting method is as follows:

Method 1.7 Montgomery Modular Multiplication for computing A·B mod M, where $$M = \Sigma_{i=0}^{m-3}(2^k)^i m_i, m_i \in \{0,1 \ldots 2^k-1\}$$

$$\tilde{M} = (M' \bmod 2^k) M, \tilde{M} = \Sigma_{i=0}^{m-2}(2^k)^i \tilde{m}_i, \tilde{m}_i \in \{0,1 \ldots 2^k-1\};$$

$$i\ B = \Sigma_{i=0}^{m-1}(2^k)^i b_i, b_i \in \{0,1 \ldots 2^k-1\};$$
$$A = \Sigma_{i=0}^{m-1}(2^k)^i a_i, a_i \in \{0,1 \ldots 2^k-1\};$$

$$A, B < 2\tilde{M}; 4\tilde{M} < 2^{km}; M' = -M^{-1} \bmod 2^k$$

1. $S_0 = 0$
2. FOR i=0 to m−1 DO
3. $q_i = (S_i + a_i B) \bmod 2^k$
4. $S_{i+1} = (S_i + q_i \tilde{M} + a_i B)/2^k$
5. END FOR The quotient $q_i$ determination complexity is further be reduced by replacing B by B·2k. Since $a_i B$ mod $2^k = 0$, step 3 is reduced to $q_i=S_i \bmod 2^k$. The addition in step 3 is avoided at the cost of an additional iteration of the loop, to compensate for the extra factor $2^k$ in B. A Montgomery method optimized for hardware implementation is shown below:

Method 1.8 Montgomery Modular Multiplication for computing A·B mod M, where $$M=\Sigma_{i=0}^{m-3}(2^k)^i m_i, m_i \in \{0,1 \ldots 2^k-1\}$$

$$\tilde{M}=(M' \bmod 2^k) M, \tilde{M}= \Sigma_{i=0}^{m-2}(2^k)^i \tilde{m}_i, \tilde{m}_i \in \{0,1 \ldots 2^k-1\};$$

$$B=\Sigma_{i=0}^{m-1}(2^k)^i b_i, b_i \in \{0,1 \ldots 2^k-1\};$$
$$A=\Sigma_{i=0}^{m}(2^k)^i a_i, a_i \in \{0,1 \ldots 2^k-1\}, a_m=0;$$

$$A,B<2\tilde{M}; 4\tilde{M}<2^{km}; M'=-M^{-1} \bmod 2^k$$

1. $S_0=0$
2. FOR i=0 to m−1 DO
3. $q_i=S_i \bmod 2^k$
4. $S_{i+1}=(S_i+q_i\tilde{M})/2^k+a_iB$
5. END FOR The final result is then Montgomery multiplied by 1 to eliminate the factors therein as discussed herein above.

In a thesis submitted to the Faculty of the Worcester Polytechnic Institute entitled Modular Exponentiation on Reconfigurable Hardware and submitted by Thomas Blum on April 8th, 1999 incorporated herein by reference, Thomas Blum proposed two different pipeline architectures for performing encryption functions using modular multiplication and Montgomery spaces: an area efficient architecture based on Method 1.6 and a speed efficient architecture. As target devices Xilinx XC4000 family devices were used.

A general radix 2 systolic array uses m times m processing elements, where m is the number of bits of the modulus and each element processes a single bit. 2m modular multiplication operations can be processed simultaneously, featuring a throughput of one modular multiplication per clock cycle and a latency of 2m cycles. As this approach results in unrealistically large CLB counts for typical bit lengths required in modern public-key schemes, only one row of processing elements was implemented. With this approach two modular multiplication operations can be processed simultaneously and the performance reduces to a throughput of two modular multiplication operations per 2m cycles. The latency remains 2m cycles.

The second consideration was the choice of the radix $r=2^k$. Increasing k reduces the amount of steps to be executed in Method 1.8. Such an approach, however, requires more resources; The main expense lies in the computation of the $2^k$ multiples of M and B. These are either pre-computed and stored in RAM or calculated by a multiplexer network. Clearly, the CLB count becomes smallest for r=2, as no multiples of M or B have to be calculated or pre-computed.

Using a radix r=2, the equation according to Method 1.6 is computed. To further reduce the required number of CLBs the following measures are optionally taken: each unit processes more than a single bit. A single adder is used to precompute B+M and to perform the other addition operation during normal processing. Squares and multiplication operations are computed in parallel. This design is divided hierarchically into three levels.

Processing Element Computes u bits of a modular multiplication.

Modular Multiplication An array of processing elements computes a modular multiplication.

Modular Exponentiation Combine modular multiplication operations to a modular exponentiation according to Algorithm 1.2.

Processing Elements

Figure 8:
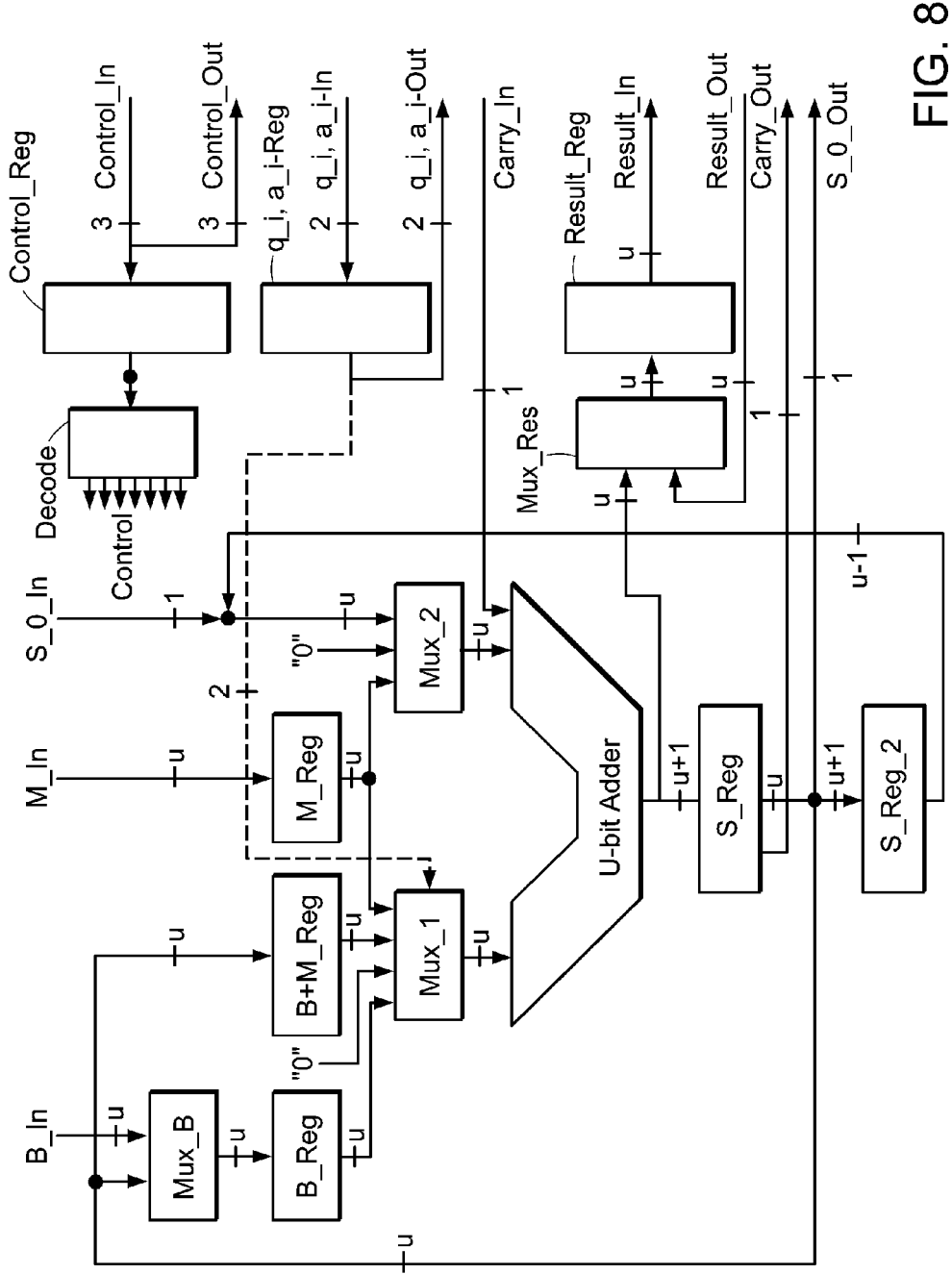
FIG. 8 is a block diagram of a resource efficient processing element design for use in a pipeline array processor for performing encryption functions.

FIG. 8 shows the implementation of a processing element. In the processing elements the following registers are present:

M-Reg (u bits): storage of the modulus
B-Reg (u bits): storage of the B multiplier
B+M-Reg (u bits): storage of the intermediate result B+M
S-Reg (u+1 bits): storage of the intermediate result (inclusive carry)
S-Reg-2 (u−1 bits): storage of the intermediate result
Control-Reg (3 bits): control of the multiplexers and clock enables
$a_i, q_i$ (2 bits): multiplier A, quotient Q
Result-Reg (u bits): storage of the result at the end of a multiplication The registers need a total of (6u+5)/2 CLBs, the adder u/2+2 CLBs, the multiplexers 4·u/2 CLBs, and the decoder 2 CLBs. The possibility of re-using registers for combinatorial logic allows some savings of CLBs. $Mux_B$ and $Mux_{Res}$ are implemented in the CLBs of B-Reg and Result-Reg, $Mux_1$ and Mux2 partially in M-Reg and B+M-Reg. The resulting costs are approximately 3u+4 CLBs per u-bit processing unit. That is 3 to 4 CLBs per bit, depending on the unit size u.

Before a unit can compute a modular multiplication, the system parameters have to be loaded. M is stored into M-Reg of the unit. At the beginning of a modular multiplication, the operand B is loaded from either B-in or S-Reg, according to the select line of multiplexer B-Mux. The next step is to compute M+B once and store the result in the B+M-Reg. This operation needs two clock cycles, as the result is clocked into S-Reg first. The select lines of $Mux_1$ and $Mux_2$ are controlled by $a_i$ or the control word respectively.

In the following 2(m+2) cycles a modular multiplication is computed according to Method 1.6. Multiplexer $Mux_1$ selects one of its inputs 0, M, B, B+M to be fed in the adder according to the value of the binary variables $a_i$ and $q_i$. $Mux_2$ feeds the u−1 most significant bits of the previous result $S\text{-}Reg_2$ plus the least significant result bit of the next unit (division by two/shift right) into the second input of the adder. The result is stored in S-Reg for one cycle. The least significant bit goes into the unit to the right (division by two/shift right) and the carry to the unit to the left. In this cycle a second modular multiplication is calculated in the adder, with updated values of $S\text{-}Reg_2$, $a_i$ and $q_i$. The second multiplication uses the same operand B but a different operand A.

At the end of a modular multiplication, $S_{m+3}$ is valid for one cycle at the output of the adder. This value is both stored into Result-Reg, as fed via S-Reg into B-Reg. The result of the second multiplication is fed into Result-Reg one cycle later.

Figure 9:
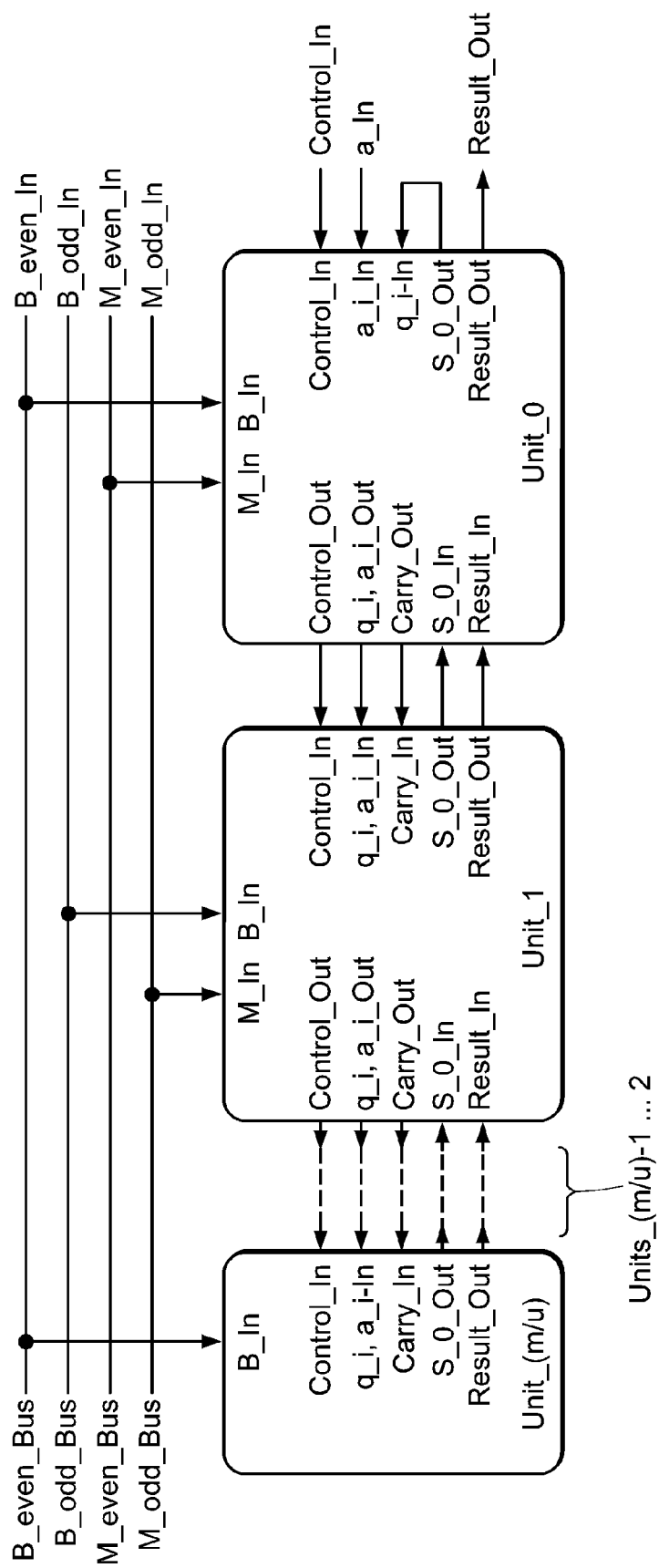
FIG. 9 is a block diagram of a systolic array for modular multiplication.

FIG. 9 shows how the processing elements are connected to an array for computing an m-bit modular multiplication. To perform the method for m bits with u bits processed per unit m/u+1 units are used. $Unit_0$ has only u−1 B inputs as $B_0$ is added to a shifted value $S_i+q_iM$. The result bit $S\text{-}Reg_0$ is always zero according to the properties of Montgomery's algorithm. $Unit_{m/u}$ processes the most significant bit of B and the temporary overflow of the intermediate result $S_{i+1}$. There is no M input into this unit.

The inputs and outputs of the units are connected to each other in the following way. The control word, $q_i$ and $a_i$ are pumped from right to left through the units. The result is pumped from left to right. The carry-out signals are fed to the carry-in inputs to the right. Output S_0_Out is always connected to input S_0_In of the unit to the right. This represents the division by 2 of the equation.

At first the modulus M is fed into the units. To allow enough time for the signals to propagate to all the units, M is valid for two clock cycles. We use two M-Buses, the M-even-Bus connected to all even numbered units and the M-odd-Bus connected to all odd numbered units this approach allows to feed u bits to the units per clock cycle. Thus it takes m/u cycles to load the full modulus M.

The operand B is loaded similarly. The signals are also valid for two clock cycles. After the operand B is loaded, the performance of the steps of Method 1.6 begins.

Starting at the rightmost unit, unit$_0$, the control word, $a_i$, and $q_i$ are fed into their registers. The adder computes S-Reg-2 plus B, M, or B+M in one clock cycle according to $a_i$ and $q_i$. The least significant bit of the result is read back as $q_{i+1}$ for the next computation. The resulting carry bit, the control word, $a_i$ and $q_i$ are pumped into the unit to the left, where the same computation takes place in the next clock cycle.

In such a systolic fashion the control word, $a_i$, $q_i$, and the carry bits are pumped from right to left through the whole unit array. The division by two in Method 1.6 leads also to a shift-right operation. The least significant bit of a unit's addition ($S_0$) is always fed back into the unit to the right. After a modular multiplication is completed, the results are pumped from left to right through the units and consecutively stored in RAM for further processing.

A single processing element computes u bits of $S_{i+1}=(S_i+q_i \cdot M)/2+a_i \cdot B$. In clock cycle i, unit$_0$ computes bits $0 \ldots u-1$ of $S_i$. In cycle i+1, unit$_1$ uses the resulting carry and computes bits $u \ldots 2u-1$ of $S_i$. Unit$_0$ uses the right shifted (division by 2) bit u of $S_i$ ($S_0$) to compute bits $0 \ldots u-1$ of $S_{i+1}$ in clock cycle i+2. Clock cycle i+1 is unproductive in unit$_0$ while waiting for the result of unit$_1$. This inefficiency is avoided by computing squares and multiplication operations in parallel according to Method 1.2. Both $p_{i+1}$ and $z_{i+1}$ depend on $z_i$. So, the intermediate result $z_i$ is stored in the B-Registers and fed with $p_i$ into the $a_i$ input of the units for squaring and multiplication.

Figure 10:
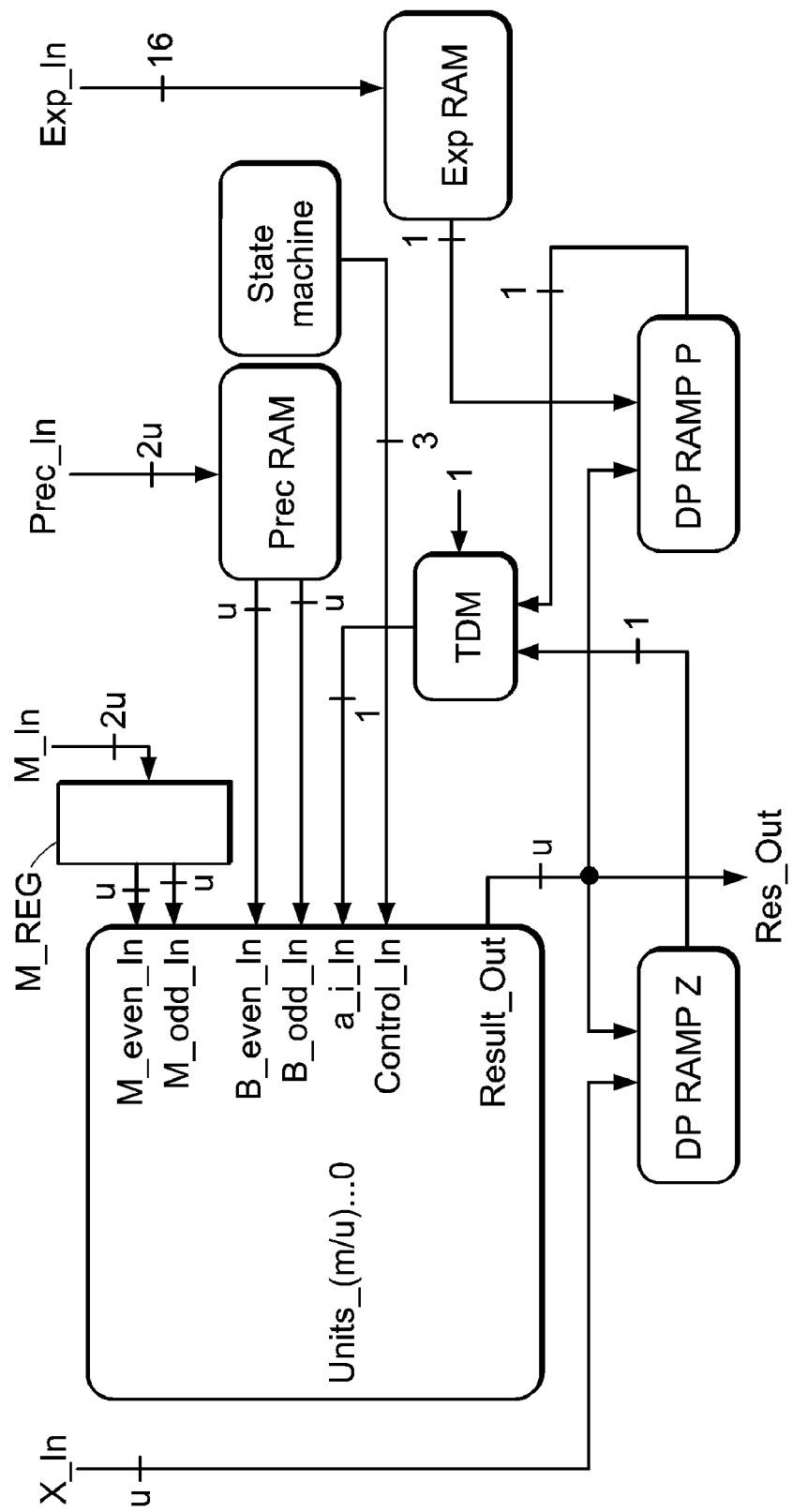
FIG. 10 is a block diagram of a single unit with its input pathways shown.

FIG. 10 shows how the array of units is utilized for modular exponentiation. At the heart of the design is a finite state machine (FSM) with 17 states. An idle state, four states for loading the system parameters, and four times three states for computing the modular exponentiation. The actual modular exponentiation is executed in four main states, pre-computation1, pre-computation2, computation, and post-computation. Each of these main states is subdivided in three sub-states, load-B, B+M, and calculate-multiplication. The control word fed into control-in is encoded according to the states. The FSM is clocked at half the clock rate. The same is true for loading and reading the RAM and DP RAM elements. This measure makes sure the maximal propagation time is in the units. Thus the minimal clock cycle time and the resulting speed of a modular exponentiation relates to the effective computation time in the units and not to the computation of overhead.

Before a modular exponentiation is computed, the system parameters are loaded. The modulus M is read 2u bits at the time from I/O into M-Reg. Reading starts from low order bits to high order bits. M is fed from M-Reg u bits at the time alternatively to M-even-Bus and M-odd-Bus. The signals are valid two cycles at a time. The exponent E is read 16 bits at the time from I/O and stored into Exp-RAM. The first 16 bit wide word from I/O specifies the length of the exponent in bits. Up to 64 following words contain the actual exponent. The pre-computation factor $2^{2(m+2)}$ mod M is read from I/O 2u bits at the time. It is stored into Prec-RAM.

In state Pre-compute1 we read the X value from I/O, u bits per clock cycle, and store it into DP RAM Z. At the same time the pre-computation factor 22(m+2) mod M is read from Prec RAM and fed u bits per clock cycle alternatively via the B-even-Bus and B-odd-Bus to the B-registers of the units. In the next two clock cycles, B+M is calculated in the units.

The initial values for Method 1.2 are available. Both values have to be multiplied by 2, which can be done in parallel as both multiplication operations use a common operand $2^{2(m+2)}$ mod M that is already stored in B. The time-division-multiplexing (TDM) unit reads X from DP RAM Z and multiplexes X and 1. After 2(m+3) clock cycles the low order bits of the result appear at Result-Out and are stored in DP RAM Z. The low order bits of the next result appear at Result-Out one cycle later and are stored in DP RAM P. This process repeats for 2m cycles, until all digits of the two results are saved in DP RAM Z and DP RAM P. The result $X \cdot 2^{m+2}$ mod M is also stored in the B-registers of the units.

In state pre-compute2 the actual steps of Method 1.2 begin. For both calculations of Z1 and P1 ZO is used as an operand. This value is stored in the B-registers. The second operand ZO or PO respectively, is read from DP RAM Z and DP RAM P and "pumped" via TDM as $a_i$ into the units. After another 2(m+3) clock cycles the low order bits of the result of Z1 and P1 appear at Result-Out. Z1 is stored in DP RAM Z. P1 is needed only if the first bit of the exponent e0 is equal to "1". Depending on e0, P1 is either stored in DP RAM P or discarded.

In state compute the loop of method 1.2 is executed n−1 times. $Z_i$ in DP RAM Z is updated after every cycle and "pumped" back as $a_i$ into the units. $P_i$ in DP RAM P is updated only if the relevant bit of the exponent $e_i$ is equal to "1". In this way always the last stored P is "pumped" back into the units.

After the processing of $e_{n-1}$, the FSM enters state post-compute. To eliminate the factor 2m+2 from the result $P_n$, a final Montgomery multiplication by 1 is computed. First the vector 0, 0, . . . 0, 1 is fed alternatively via the B-even-Bus and B-odd-Bus into the B-registers of the units. $P_n$ is "pumped" from DP RAM P as $a_i$ into the units. After state post-compute is executed, u bits of the result $P_n$=XE mod M are valid at the I/O port. Every two clock cycles another u bits appear at I/O. State pre-compute1 can be re-entered immediately now for the calculation of another X value.

A full modular exponentiation is computed in 2(n+2)(m+4) clock cycles. That is the delay it takes from inserting the first u bits of X into the device until the first u result bits appear at the output. At that point, another X value can enter the device. With a additional latency of m/u clock cycles the last u bits appear on the output bus.

Figure 11:
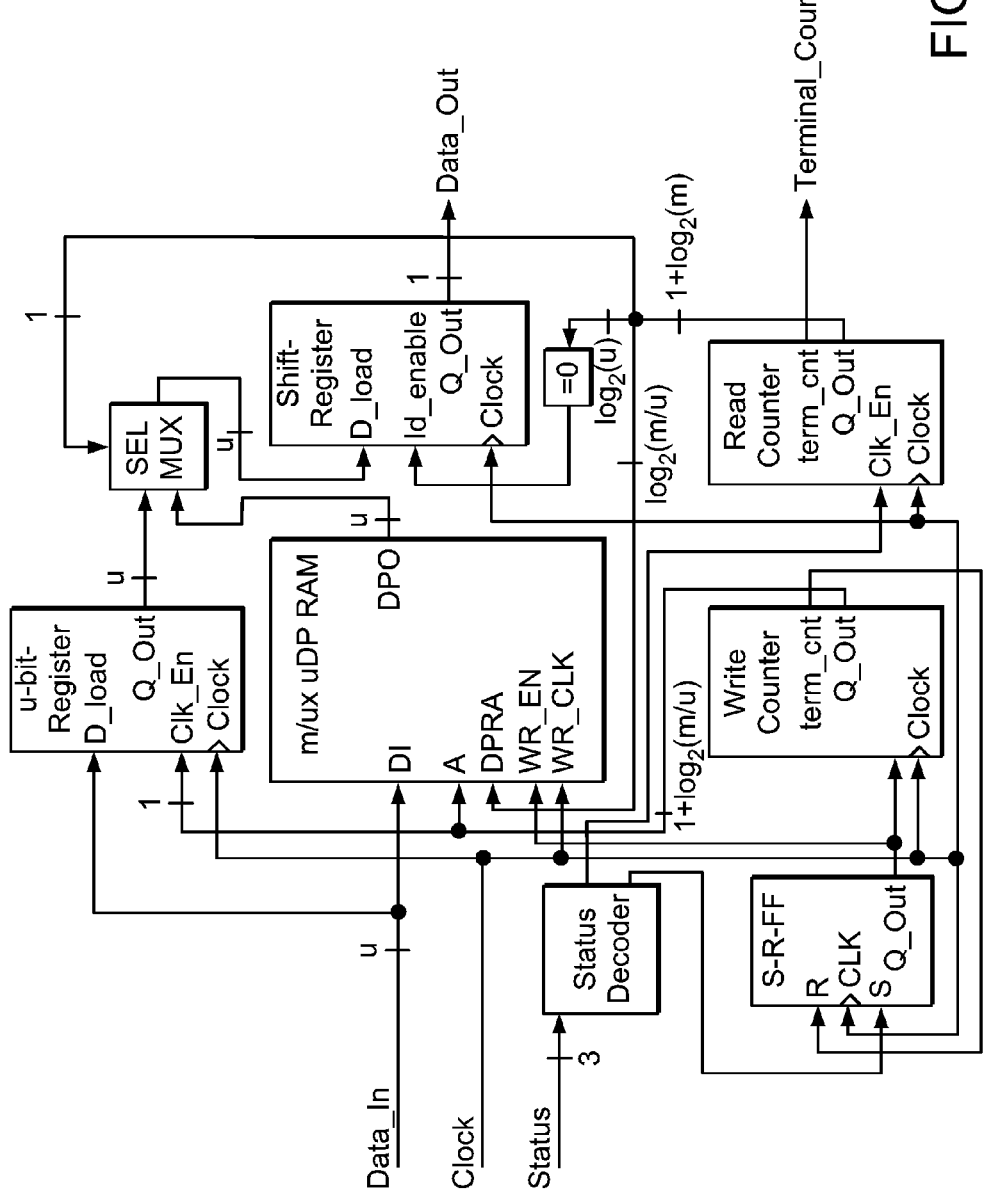
FIG. 11 is a block diagram of a DP RAM Z unit.

Hereinbelow the function blocks in FIG. 10 are explained. FIG. 11 shows the design of DP RAM Z. An m/u×u bit DP RAM is at the heart of this unit. It has separate write (A) and read (DPRA) address inputs. The write-counter counting up to m/u computes the write address (A). The write-counter starts counting (clock-enable) in sub-states B-load when the first u bits of $Z_i$ appear at data in. At the same time the enable signal of the DP RAM is active and data is stored in DP RAM. Terminal-count resets count-enable and write-enable of DP RAM when m/u is reached. The read-counter is enabled in the sub-states compute. When read-counter reaches its upper limit m+2, terminal-count triggers the FSM to transit into sub-state B-load. The $\log_2(m/u)$ most significant bits of the read-counter value (q out) address DPRA of the DP RAM. Every u cycles another value stored in the DP RAM is read. This value is loaded into the shift register when the $\log_2(u)$ least significant bits of q out reach zero. The next u cycles u bits appear bit by bit at the serial output of the shift register. The last value of $z_i$ is stored in a u-bit register. This measure allows us to select an m/u×u-bit DP RAM instead of an 2m/u×u-bit DP RAM (m=2x, x=8, 9, 10).

DP RAM P works almost the same way. It has an additional input $e_i$, that activates the write-enable signal of the DP RAM in the case of $e_i=1$.

Figure 12:
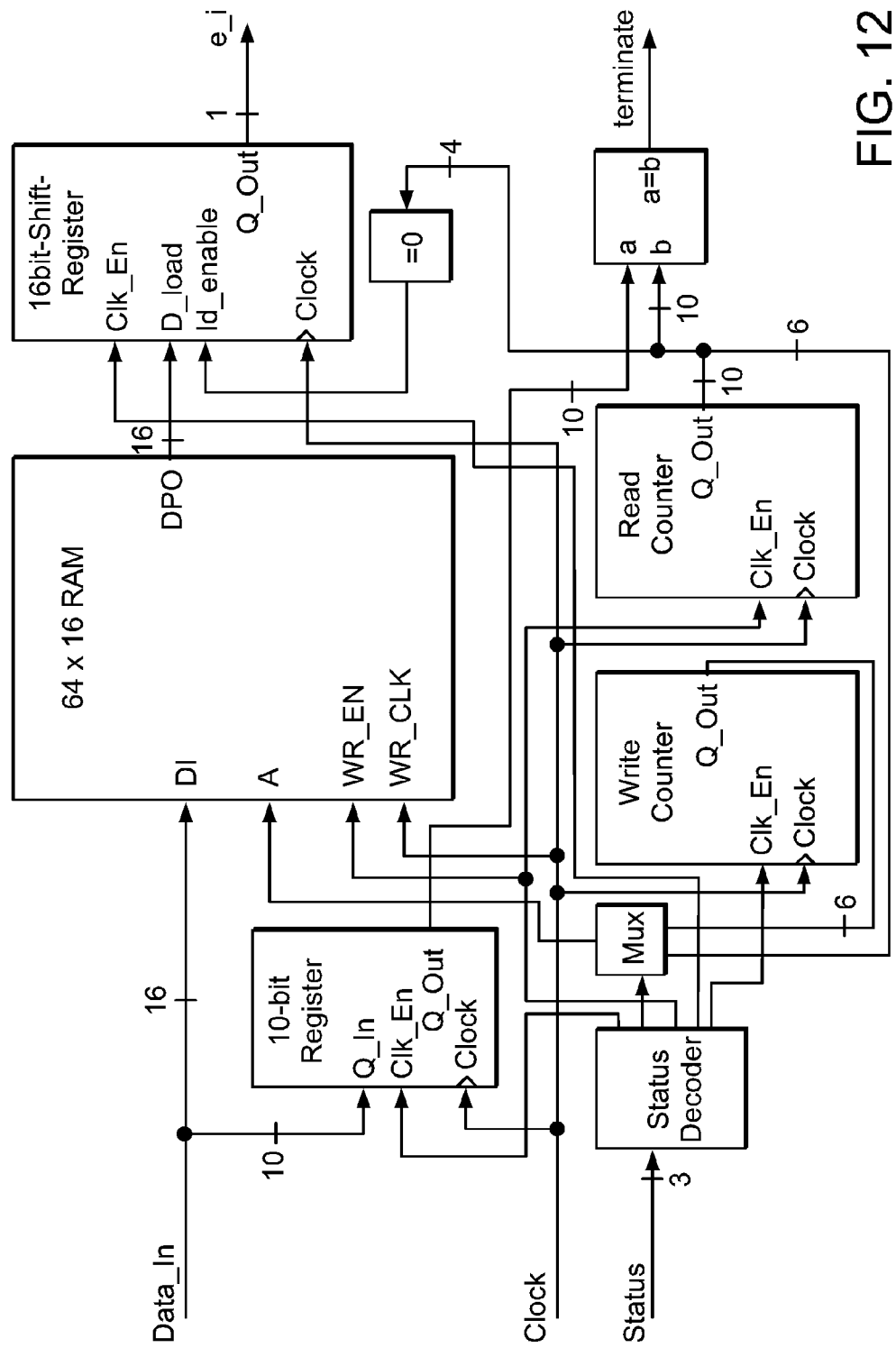
FIG. 12 is a block diagram of an Exp RAM unit.

FIG. 12 shows the design of Exp RAM. In the first cycle of the load-exponent state, the first word is read from I/O and stored into the 10-bit register. Its value specifies the length of the exponent in bits. In the next cycles the exponent is read 16-bit at a time and stored in RAM. The storage address is computed by a 6-bit write counter. At the beginning of each compute state the 10-bit read counter is enabled. Its 6 most significant bits compute the memory address. Thus every 16th activation, a new value is read from RAM. This value is stored in the 16-bit shift-register at the same time when the 4 least significant bits of read counter are equal to zero. When read counter reaches the value specified in the 10-bit register, the terminate signal triggers the FSM to enter state post-compute.

Figure 13:
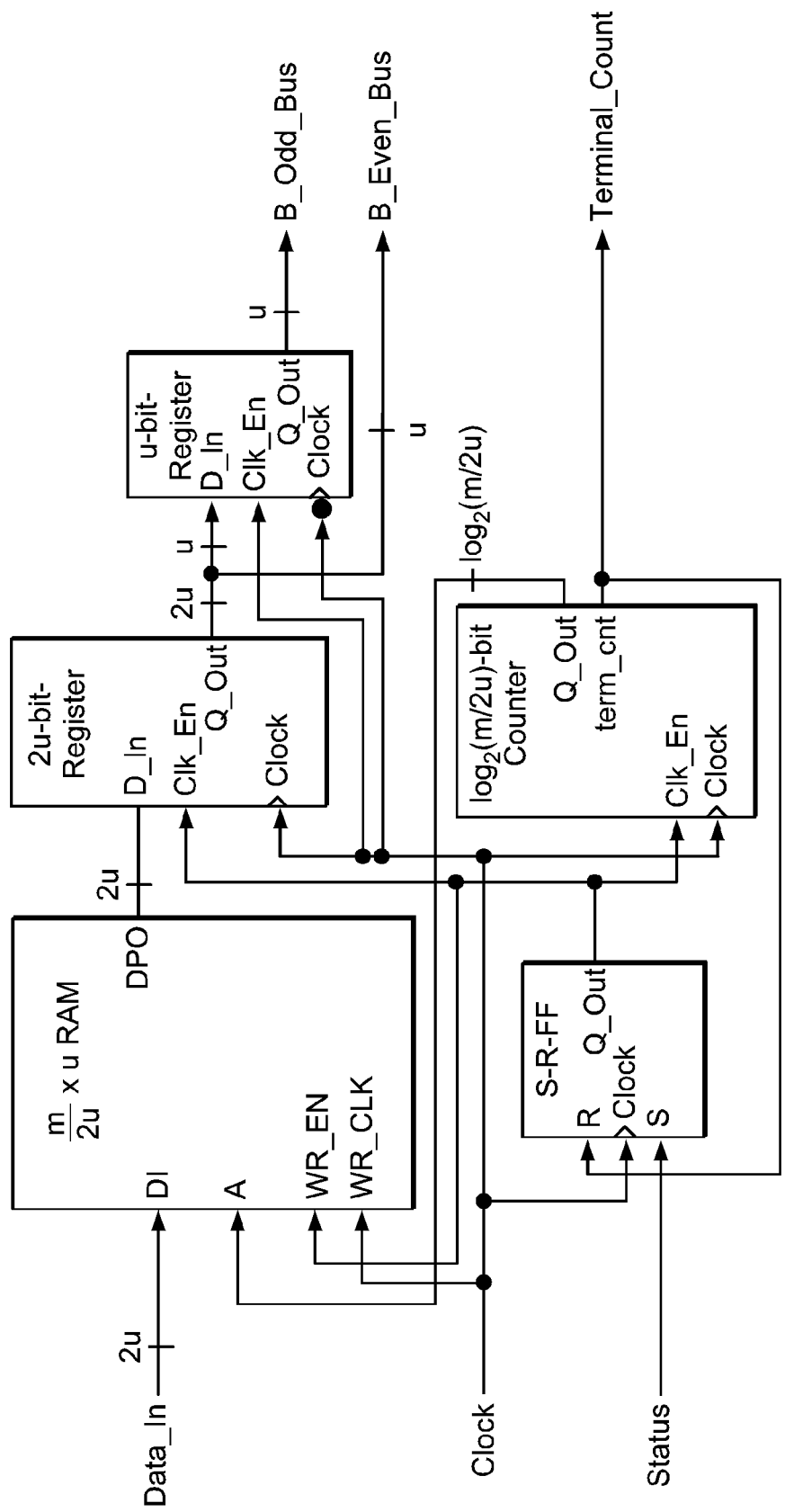
FIG. 13 is a block diagram of a Prec RAM unit.

FIG. 13 shows the design of Prec RAM. In state load-prefactor the pre-computation factor is read 2u bits at the time from I/O and stored in RAM. A counter that counts up to m/2u addresses the RAM. When all m/2u values are read, the terminal-count signal triggers the FSM to leave state load-prefactor.

In state pre-compute1 the pre-computation factor is read from RAM and fed to the B-registers of the units. The counter is incremented each clock cycle and 2u bits are loaded in the 2u-bit register. From there u bits are fed on B-even-bus each positive edge of the clock. On the negative clock edge, u bits are fed on the B-odd-bus.

A Speed Efficient Architecture

The above design was optimized in terms of resource usage. Using a radix $r=2^k$, $k>1$, reduces the number of steps in Method 1.6 by a factor k. The computation of Method 1.8 is executed m+3 times (i=0 to m+2)

A speed efficient design is readily divided hierarchically into three levels.

Processing Element Computes 4 bits of a modular multiplication.

Modular Multiplication An array of processing elements computes a modular multiplication.

Modular Exponentiation Combines modular multiplication operations to a modular exponentiation according to Method 12.

Figure 14:
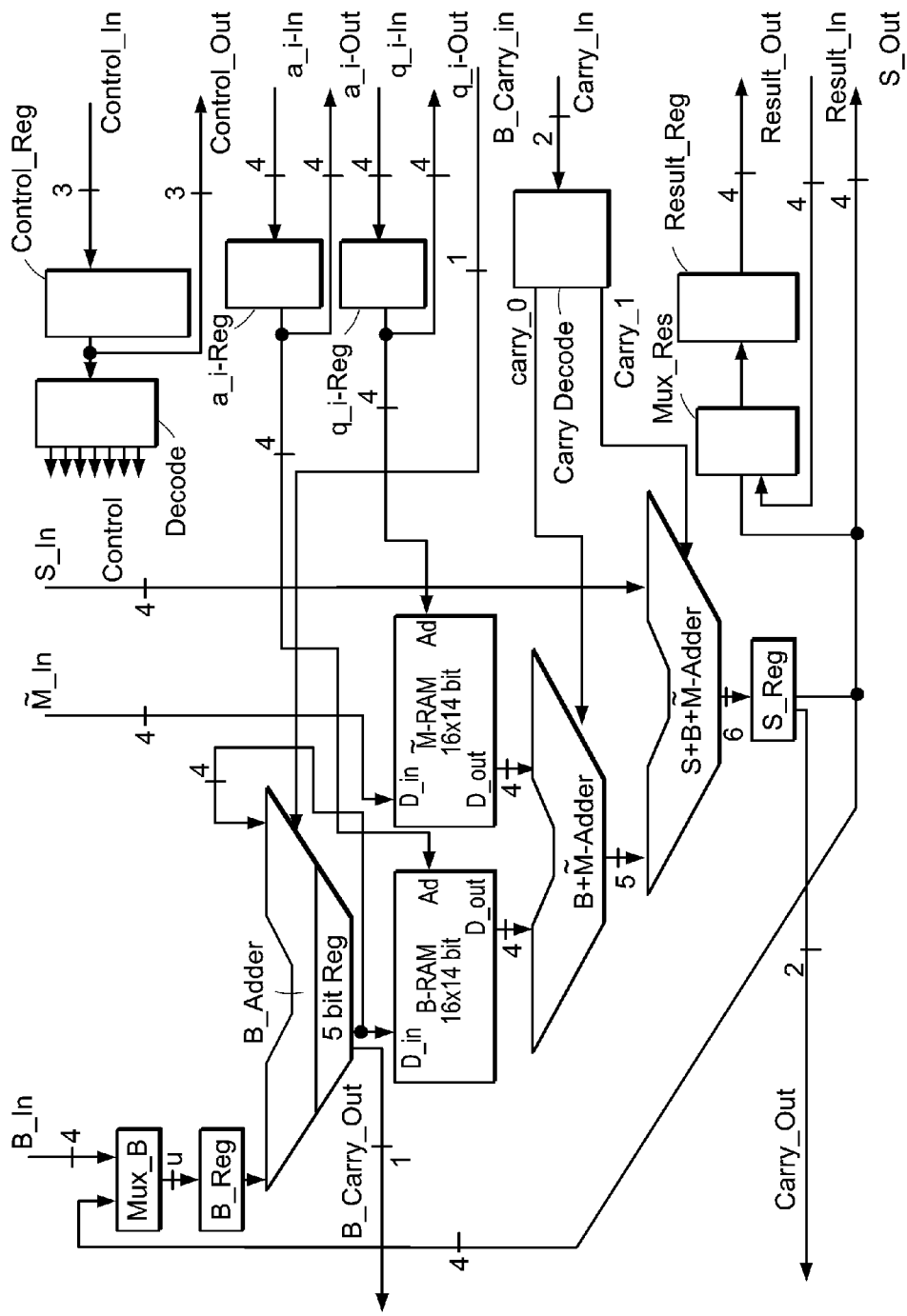
FIG. 14 is a block diagram of a speed efficient processing element design for use in a pipeline array processor for performing encryption functions.

FIG. 14 shows the implementation of a processing element. The following elements are provided:

B-Reg (4 bits): storage of the B multiplier
B-Adder-Reg (5 bits): storage of multiples of B
S-Reg (4 bits): storage of the intermediate result S,
Control-Reg (3 bits): control of the multiplexers and clock enables
$a_i$-Reg (4 bits): multiplier A
$q_i$-Reg (4 bits): quotient Q
Result-Reg (4 bits): storage of the result at the end of a multiplication
B-Adder (4 bits): Adds B to the previously computed multiple of B
B+M~-Adder (4 bits): Adds a multiple of M~ to a multiple of B
S+B+M~-Adder (5 bits): Adds the intermediate result $M^{\sim S_i}$ to $B+$
B-RAM (16×4 bits): Stores 16 multiples of B
M~-RAM (16×4 bits): Stores 16 multiples of M~

The operation of the units is evident from the thesis of T. Blum, referenced above, and from a review of the diagrams.

Figure 15:
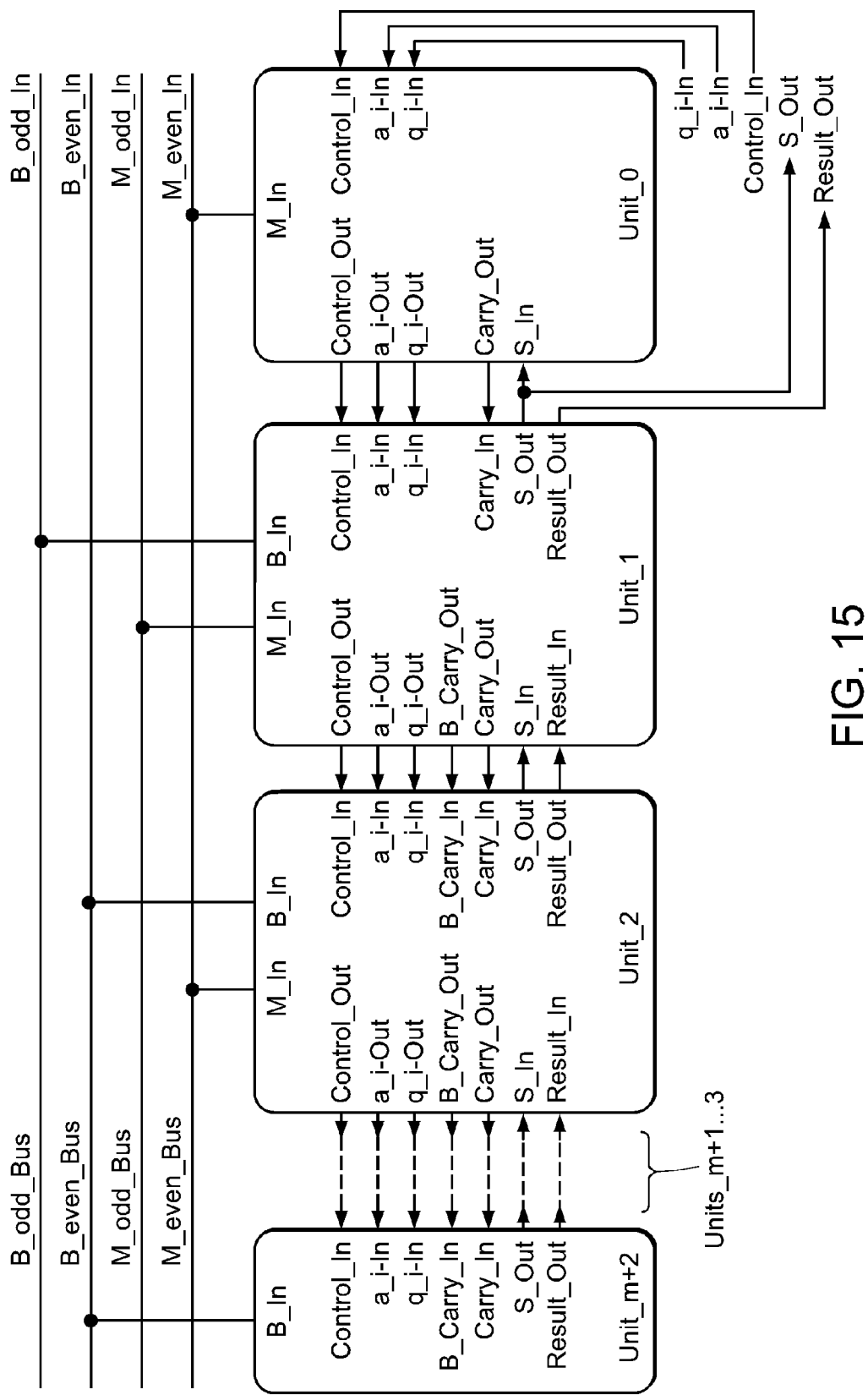
FIG. 15 is a block diagram of a systolic array for modular multiplication.

FIG. 15 shows how the processing elements are connected to an array for computing a full size modular multiplication.

Figure 16:
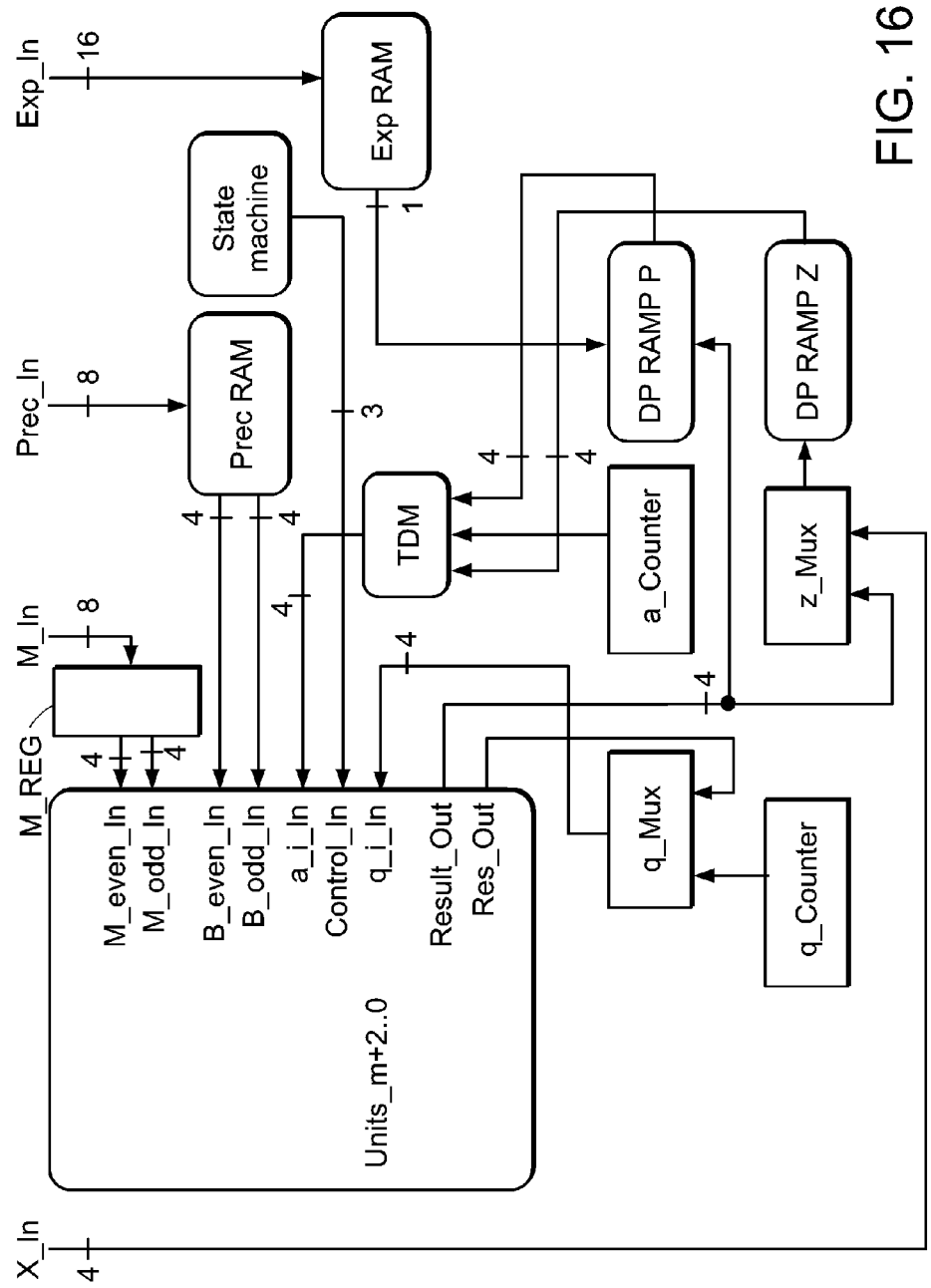
FIG. 16 is a block diagram of a single unit with its input pathways shown.

FIG. 16 shows how the array of units is utilized for modular exponentiation.

Figure 17:
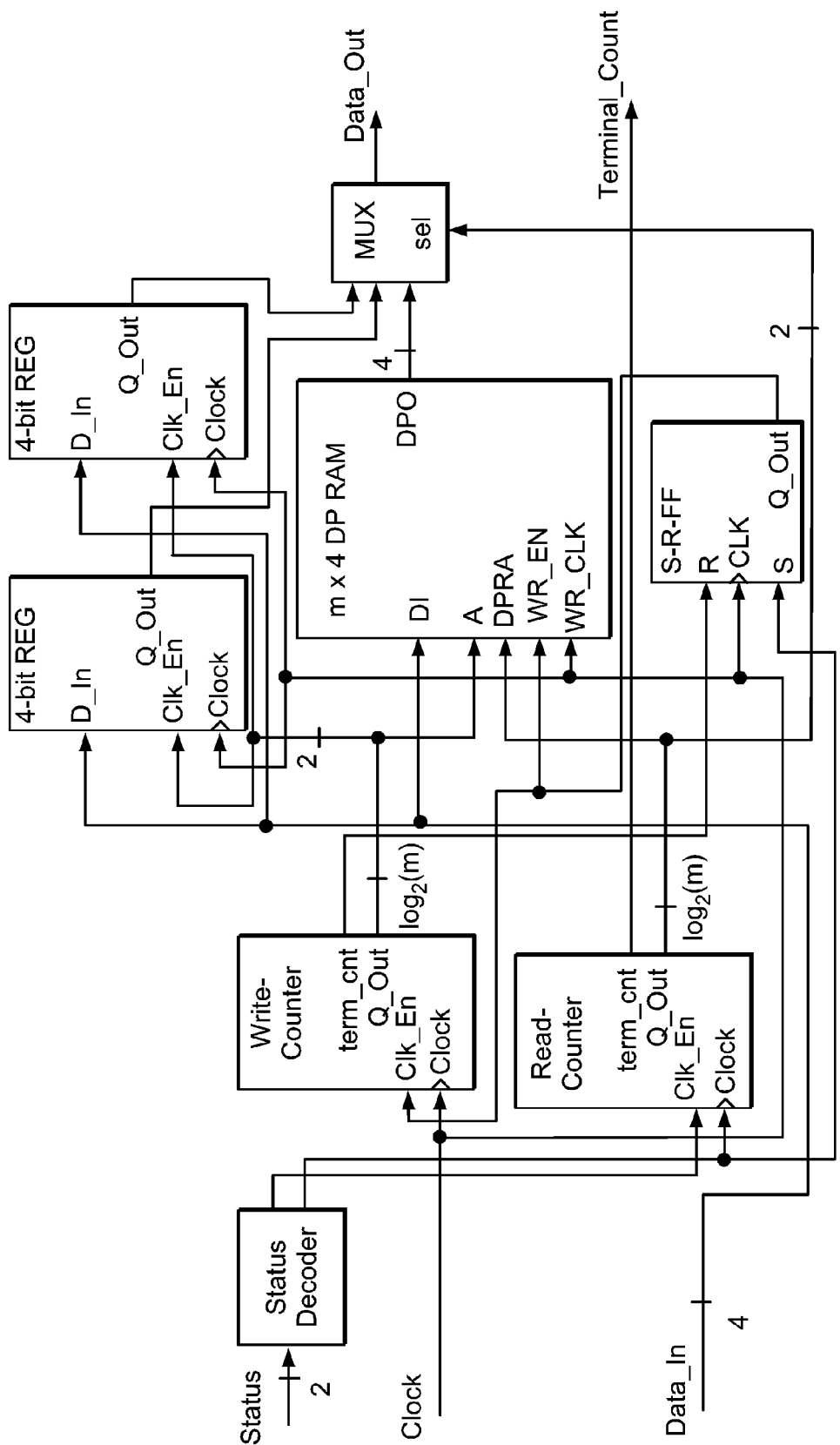
FIG. 17 is a block diagram of a DP RAM Z unit.

FIG. 17 shows the design of DP RAM Z. An m×4 bit DP RAM is at the heart of this unit. It has separate write (A) and read (DPRA) address inputs. Two counters that count up to m+2 compute these addresses. The write-counter starts counting (clock-enable) in sub-states B-load when the first digit of $Z_i$ appears at data in. At the same time the enable signal of the DP RAM is active and data is stored in DP RAM. When m+2 is reached, the terminal-count signal of the write-counter resets the two enable signals. The read-counter is enabled in sub-states compute. The data of DP RAM is addressed by q out of the read-counter and appears immediately at DPO. When read-counter reaches m+2, terminal-count triggers the FSM to transit into sub-state B-load. The last two values of $z_i$ are stored in a 4-bit register each.

This measure allows us to choose a 100% utilized m×4-bit DP RAM instead of an only 50% utilized 2m×4-bit DP RAM. DP RAM P works almost the same way. It has an additional input $e_i$, that activates the write-enable signal of the DP RAM in the case of $e_i$="1."

Since the above pipeline processor architectures embody many pipelined processing elements, it is often difficult and costly to synchronise each element to the clock source within a same integrated circuit. Therefore, the present invention is highly advantageous in reducing overall resource requirements by reducing clock distribution problems. Also, since in one direction addition is required while in the other direction multiplication is required, it is evident that more time is necessary along one path than the other and, so, time-averaging of the paths is possible in accordance with an embodiment of the invention.

Numerous other embodiments may be envisaged without departing from the spirit or scope of the invention.

What is claimed is:

1. A system for processing data, comprising:
an input port for receiving data to be processed;
at least one array of processing units, each of the at least one array being in communication with the port and each array comprising a plurality of arrays of processing units, wherein a first array of the plurality of arrays is connected to the input port for receiving the data to be processed and that at least one processing unit of the first array transmits the processed block of data to a next serially-connected processing unit within a second array distinct from the first array the data to be processed is a first data to be processed; and
logic in communication with at least some of the processing units, the logic being operative to:
determine, for the data to be processed, a last processing unit of the serially connected processing units based at least in part on a size of an encryption key corresponding to the data to be processed, wherein at least two of the processing units are determinable as the last processing unit; and
cause the last processing unit to process a received block of data and return a resulting processed block of data to an output port of the system without transmitting the resulting processed block of data to the next processing unit of the last processing unit;
wherein a first processing unit of the second array is further connected to the input port for receiving a second data to be processed independently of the first data when the received block of data originates from the first array, each processing unit of the second array is operative to transmit the resulting processed block of data to a next serially-connected processing unit in a first direction.

2. The system of claim 1, wherein:
the logic is further in electrical communication with the input port for:
processing data indicative of the size of the encryption key to determine the last processing unit of the plurality of arrays; and
transmitting a signal to the last processing unit based on a result of processing the data indicative of the size of the encryption key.

3. The system of claim 2, wherein:
the logic comprises a gate logic switching circuit for providing the signal to the last processing unit via an addressable data path.

4. The system of claim 1, wherein:
the logic comprises a logic circuit internal to each of the at least some processing units for:
processing data indicative of the size of the encryption key; and
transmitting a signal internal to the processing unit indicative of a last processing unit status, the signal being provided in dependence upon a result of processing the data indicative of the size of the encryption key.

5. The system of claim 1, wherein:
at least one processing unit of the second array is operative to transmit the processed block of data to a next serially-connected processing unit within a third array distinct from the second array.

6. A method of processing data by at least one array of serially-connected processing units, each processing unit being serially connected to a next processing unit, the method comprising:
receiving data at an input port;
providing an encryption key of a length of one of a plurality of possible lengths to the processing unit of the at least one array of serially-connected processing units;
determining, based on a size of the encryption key associated with the received data, a last processing unit of the at least one array of serially-connected processing units, wherein at least two of the processing units are determinable as the last processing unit and less than a total number of processing units are determinable as the last processing unit; and
at each processing unit:
processing a block of the received data;
if the processing unit is not the last processing unit, transmitting the processed block of the received data to the next processing unit; and
if the processing unit is the last processing unit, returning the processed block of the received data to an output port without transmitting the processed block of the data to the next processing unit.

7. The method of claim 6, wherein determining a last processing unit comprises:
processing data indicative of the size of the encryption key to determine the last processing unit of the at least one array; and
providing a signal to the last processing unit based on a result of processing the data indicative of the size of the encryption key.

8. The method of claim 7, wherein processing data indicative of the size of the encryption key to determine the last processing unit comprises:
decrementing a counter from an initial value indicative of the size of the encryption key; and
sending a signal to at least the last processing unit in response to the counter reaching a predetermined value indicative of a final processing cycle.

9. The method of claim 8, wherein sending a signal to at least the last processing unit comprises:
sending a signal to every processing unit.

10. The method of claim 8, wherein sending a signal to at least the last processing unit comprises:
sending a signal to the last processing unit via an addressable data path.

11. The method of claim 6, wherein the encryption key is padded to an integer multiple of a predetermined number of bits and wherein the predetermined number of bits is equal to an integer multiple of a number of bits processed by an individual processing unit of the plurality of processing unit during one processing cycle.

12. The method of claim 6 further comprising:
providing a signal to the determined last processing unit indicative of the determination, wherein only those processing units determinable as last processing units are provided with circuitry for receiving the signal.

13. The method of claim 6, further comprising:
providing a signal to the last processing units-indicative of the processing unit being the last processing unit.

14. The method of claim 6, further comprising:
processing data indicative of the size of the encryption key to determine the last processing unit of the at least one array using one of a decrementing operation and an incrementing operation.

15. The method of claim 6, further comprising:
processing data indicative of the size of the encryption key to determine the last processing unit of the at least one array using circuitry internal to a first processing unit.

16. The method of claim 6, further comprising:
propagating the processed data indicative of the encryption key size to at least the next processing unit for additional processing using internal circuitry thereof.

* * * * *